US012198643B2

(12) United States Patent
Monomoshi

(10) Patent No.: US 12,198,643 B2
(45) Date of Patent: Jan. 14, 2025

(54) GRADATION CONTROL IN DISPLAY OF IMAGE

(71) Applicant: NICHIA CORPORATION, Anan (JP)

(72) Inventor: Masahiko Monomoshi, Itano-gun (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 17/677,703

(22) Filed: Feb. 22, 2022

(65) Prior Publication Data

US 2022/0277700 A1 Sep. 1, 2022

(30) Foreign Application Priority Data

Feb. 26, 2021 (JP) ................................ 2021-030119

(51) Int. Cl.

*G09G 3/34* (2006.01)
*G09G 3/36* (2006.01)
*G09G 3/20* (2006.01)

(52) U.S. Cl.

CPC ............ *G09G 3/3426* (2013.01); *G09G 3/36* (2013.01); *G09G 3/2096* (2013.01); *G09G 3/3611* (2013.01); *G09G 2320/0233* (2013.01); *G09G 2320/0276* (2013.01); *G09G 2320/0626* (2013.01); *G09G 2320/0646* (2013.01); *G09G 2320/0673* (2013.01); *G09G 2360/16* (2013.01)

(58) Field of Classification Search

CPC .................. G09G 3/3426; G09G 3/36; G09G 2320/0626; G09G 2320/0673; G09G 2360/16; G09G 2320/0233; G09G 2320/0646; G09G 3/2096; G09G 3/3611; G09G 2320/0276

See application file for complete search history.

(56) References Cited

U.S. PATENT DOCUMENTS

2008/0278432 A1 11/2008 Ohshima
2009/0009456 A1 1/2009 Ohshima
(Continued)

FOREIGN PATENT DOCUMENTS

JP 2003-069824 A 3/2003
JP 2008-304908 A 12/2008
(Continued)

*Primary Examiner* — William Boddie
*Assistant Examiner* — Saifeldin E Elnafia
(74) *Attorney, Agent, or Firm* — Kim & Stewart LLP

(57) ABSTRACT

A method includes generating luminance setting data, luminance estimation data, maximum luminance data, and gradation setting data, and controlling a backlight panel and a liquid crystal panel based on the luminance setting data and the gradation setting data, respectively. The luminance setting data sets a luminance value for each light-emitting region of the backlight panel and is generated based on an input image. The luminance estimation data indicates an estimated luminance value of backlight for the input image with respect to each pixel of the liquid crystal panel and is generated based on the luminance setting data and luminance profile data. The maximum luminance data is generated based on the luminance estimation data. The gradation setting data sets a gradation value of each pixel of the liquid crystal panel for the input image, and is generated based on the input image, the luminance estimation data, and the maximum luminance data.

14 Claims, 17 Drawing Sheets

(56) References Cited

U.S. PATENT DOCUMENTS

| | | | | |
|---|---|---|---|---|
| 2009/0140975 | A1* | 6/2009 | Nonaka | G09G 3/3426 345/102 |
| 2010/0182346 | A1 | 7/2010 | Sano et al. | |
| 2012/0105509 | A1* | 5/2012 | Ito | G09G 3/3426 345/690 |
| 2016/0322005 | A1* | 11/2016 | Umeyama | G09G 3/3426 |
| 2016/0343311 | A1 | 11/2016 | Morikawa et al. | |
| 2017/0061894 | A1 | 3/2017 | Ikeda et al. | |
| 2017/0155835 | A1* | 6/2017 | Ikefuji | H04N 23/667 |
| 2018/0047345 | A1* | 2/2018 | Dunn | G02F 1/133606 |
| 2018/0157121 | A1 | 6/2018 | Matsuura et al. | |

FOREIGN PATENT DOCUMENTS

| | | | |
|---|---|---|---|
| JP | 2009-251331 | A | 10/2009 |
| JP | 2010-164851 | A | 7/2010 |
| JP | 2016-173466 | A | 9/2016 |
| JP | 2016-218223 | A | 12/2016 |
| JP | 2017-045030 | A | 3/2017 |
| JP | 2017-184220 | A | 10/2017 |
| JP | 2018-054683 | A | 4/2018 |
| JP | 2018-092082 | A | 6/2018 |
| JP | 2019-041269 | A | 3/2019 |
| JP | 2019-211582 | A | 12/2019 |
| WO | 2019/039111 | A1 | 2/2019 |
| WO | 2020/235177 | A1 | 11/2020 |

* cited by examiner

GRADATION CONTROL IN DISPLAY OF IMAGE

CROSS-REFERENCE TO RELATED APPLICATIONS

This application is based upon and claims the benefit of priority from the prior Japanese Patent Application No. 2021-030119, filed on Feb. 26, 2021; the entire contents of which are incorporated herein by reference.

FIELD

Embodiments relate to an image display method and a display that performs the same.

BACKGROUND

A conventionally-known image display device includes a backlight and a liquid crystal panel. The backlight includes multiple light-emitting regions arranged in a matrix configuration and light sources in the light-emitting regions. The liquid crystal panel is located above the backlight and includes multiple pixels. By using such an image display device, luminances of the light-emitting regions can be set differently for each of images to be displayed in the liquid crystal panel. Also, gradations of the pixels of the liquid crystal panel can be set according to the set luminances of the light-emitting regions. The contrast of the image can be improved thereby. Such technology is called "local dimming".

According to a known method of setting gradations of the pixels of the liquid crystal panel in local dimming, the setting values of gradations of the pixels of the liquid crystal panel are generated by estimating luminances directly under the pixels of the liquid crystal panel based on the setting values of the luminances of the light-emitting regions of the backlight. Then, gradations of the pixels of the image to be displayed are corrected based on the estimated luminances directly under the pixels. In such a case, it is desirable to set the gradations of the pixels of the liquid crystal panel to improve the contrast of the image to be displayed on the liquid crystal panel.

SUMMARY

Embodiments are directed to an image display method and an image display device in which contrast of an image to be displayed is improved.

An image display method includes generating luminance setting data, generating luminance estimation data, generating maximum luminance data, generating gradation setting data, and controlling a backlight panel to operate based on the luminance setting data and a liquid crystal panel to operate based on the gradation setting data to display an image corresponding to an input image. The luminance setting data sets a luminance value for each of a plurality of light-emitting regions of the backlight panel configured in a matrix form and is generated based on the input image. The luminance estimation data indicates an estimated luminance value of backlight for the input image with respect to each of a plurality of pixels of the liquid crystal panel and is generated based on the luminance setting data and luminance profile data indicating a luminance distribution in each of the light-emitting regions of the backlight panel. The maximum luminance data is generated on the estimated luminance values of the pixels in the luminance estimation data. The gradation setting data sets a gradation value of each of the pixels of the liquid crystal panel for the input image, and is generated based on the input image, the luminance estimation data, and the maximum luminance data.

According to embodiments, an image display method and an image display device can be provided in which contrast of an image to be displayed is improved.

DETAILED DESCRIPTION

Figure 1:
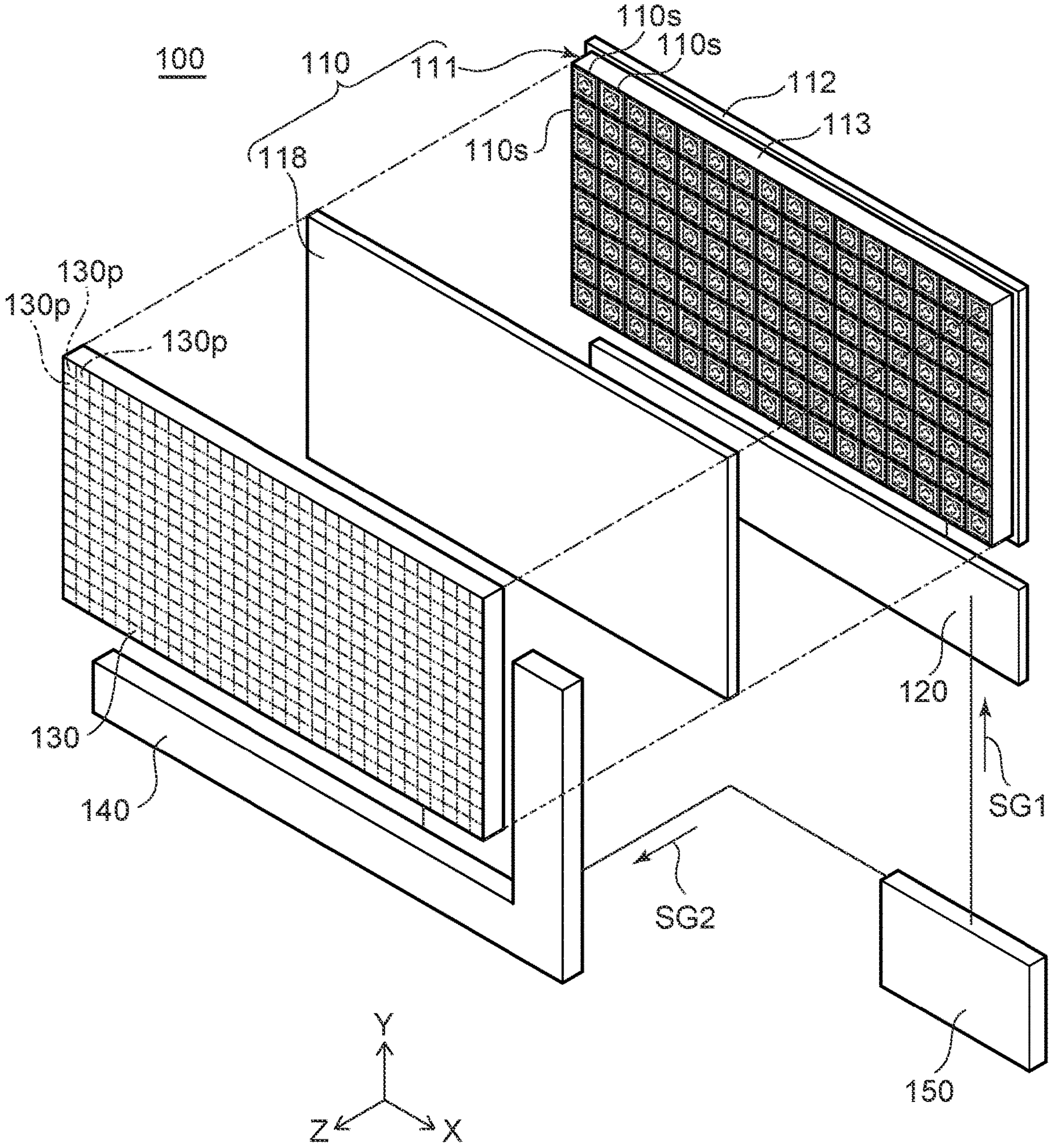
FIG. 1 illustrates an exploded perspective view of an image display device according to a first embodiment.

Exemplary embodiments will now be described with reference to the drawings. The drawings are schematic or conceptual; and the relationships between the thickness and width of portions, the proportional coefficients of sizes among portions, etc., are not necessarily the same as actual values thereof. Furthermore, the dimensions and proportional coefficients may be illustrated differently among the drawings, even for identical portions. In the specification and the drawings of the application, components similar to those described in regard to a drawing hereinabove are marked with like reference numerals, and a detailed description is omitted as appropriate.

For easier understanding of the following description, arrangements and configurations of portions of an image display device are described using an XYZ orthogonal coordinate system. X-axis, Y-axis, and Z-axis are orthogonal to each other. The direction in which the X-axis extends is referred to as an “X-direction”; the direction in which the Y-axis extends is referred to as a “Y-direction”; and the direction in which the Z-axis extends is referred to as a “Z-direction”. For easier understanding of the description, the Z-direction is called up, and the opposite direction is called down, but these directions are independent of the direction of gravity. For easier understanding of the description of the drawings, the X-axis direction in the direction of the arrow is referred to as the “+X direction”; and the opposite direction is referred to as the “−X direction”. Similarly, the Y-axis direction in the direction of the arrow is referred to as the “+Y direction”; and the opposite direction is taken as the “−Y direction”.

First Embodiment

First, a first embodiment will be described.

FIG. 1 illustrates an exploded perspective view of an image display device according to the embodiment.

An image display device 100 according to the first embodiment is, for example, a liquid crystal module (LCM) used in a display of a device such as a television, a personal computer, a game machine, etc. The image display device 100 includes a backlight (may be referred to as “backlight panel”) 110, a driver 120 for the backlight, a liquid crystal panel 130, a driver 140 for the liquid crystal panel, and a controller 150. Components of the image display device 100 will be described hereinafter. For easier understanding of the description, electrical connections between the components are shown by connecting the components to each other with solid lines in FIG. 1.

The backlight 110 is compatible with local dimming. The backlight 110 includes a planar light source 111, and an optical member 118 located on the planar light source 111.

Although not particularly limited, the optical member 118 is, for example, a sheet, a film, or a plate that has a light-modulating function such as a light-diffusing function, etc. According to the present embodiment, the number of the optical members 118 included in the backlight 110 is one. However, the number of optical members included in the backlight may be two or more.

Figure 2:
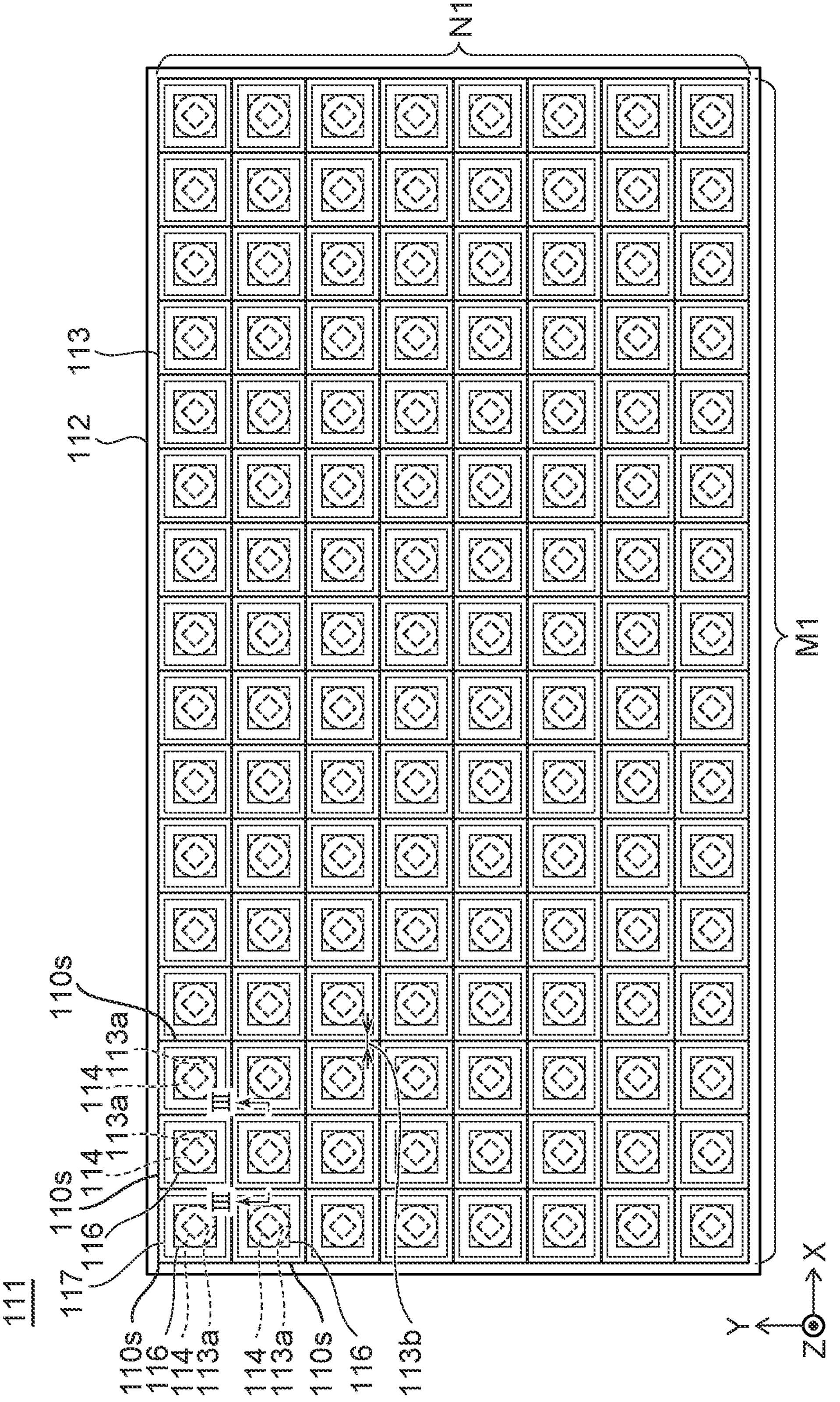
FIG. 2 illustrates a top view of a planar light source of a backlight included in the image display device according to the first embodiment.

FIG. 2 illustrates a top view of the planar light source 111 of the image display device according to the first embodiment.

Figure 3:
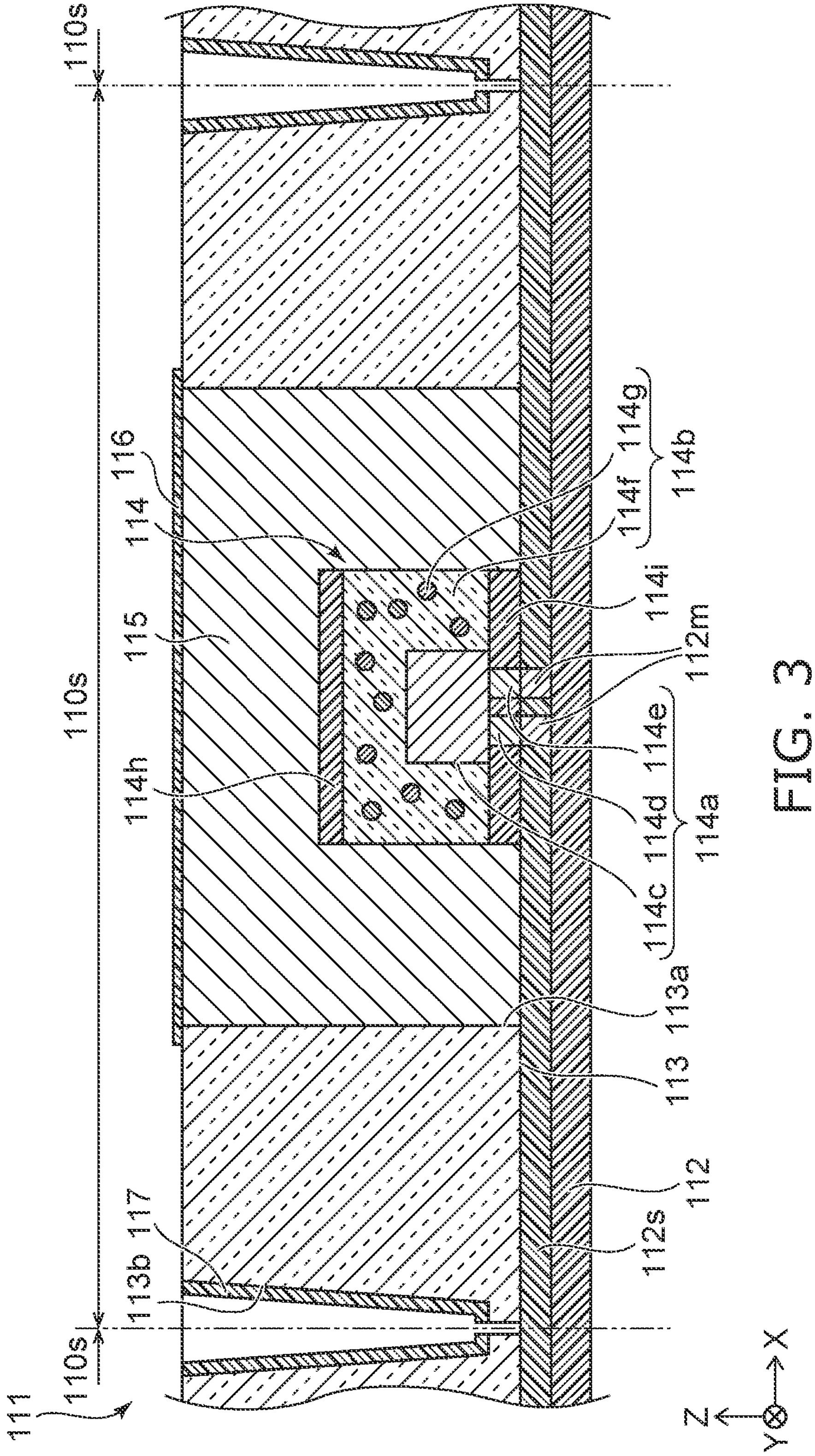
FIG. 3 illustrates a cross-sectional view of the planar light source along line in FIG. 2.

FIG. 3 illustrates a cross-sectional view of the planar light source 111 along line in FIG. 2.

According to the first embodiment, as shown in FIGS. 2 and 3, the planar light source 111 includes a substrate 112, a light-reflective sheet 112*s*, a light guide member 113, multiple light sources 114, a light-transmitting member 115, a first light-modulating member 116, and a light-reflecting member 117.

The substrate 112 is a wiring substrate that includes an insulating member, and multiple wiring located in the insulating member. According to the present embodiment, the shape of the substrate 112 in top-view is substantially rectangular as shown in FIG. 2. However, the shape of the substrate is not limited to the aforementioned shape. The upper surface and the lower surface of the substrate 112 are flat surfaces and are substantially parallel to the X-direction and the Y-direction.

As shown in FIG. 3, the light-reflective sheet 112*s* is located on the substrate 112. According to the present embodiment, the light-reflective sheet 112*s* includes a first adhesive layer, a light-reflecting layer on the first adhesive layer, and a second adhesive layer on the light-reflecting layer. The light-reflective sheet 112*s* is adhered to the substrate 112 with the first adhesive layer.

The light guide member 113 is located on the light-reflective sheet 112*s*. At least a portion of a lower surface of the light guide member 113 is adhered to the light-reflective sheet 112*s* with the second adhesive layer. According to the present embodiment, the light guide member 113 is plate-shaped. The thickness of the light guide member 113 is preferably, for example, not less than 200 μm and not more than 800 μm. In the thickness direction, the light guide member 113 may include a single layer or may include a stacked body of multiple layers. According to the present embodiment, the shape of the light guide member 113 in top-view is substantially rectangular as shown in FIG. 2. However, the shape of the light guide member is not limited to the aforementioned shape.

For example, a thermoplastic resin such as acrylic, polycarbonate, cyclic polyolefin, polyethylene terephthalate, polyester, or the like, an epoxy, a thermosetting resin such as silicone or the like, and glass, etc., can be used as a material used for the light guide member 113.

Multiple light source placement portions 113*a* are located in the light guide member 113. The multiple light source placement portions 113*a* are arranged in a matrix configuration in top-view. According to the present embodiment, as shown in FIG. 3, each light source placement portion 113*a* is a through-hole that extends through the light guide member 113 in the Z-direction. Alternatively, the light source placement portion 113*a* may be a bottomed recess located at the lower surface of the light guide member 113.

The light sources 114 are located in the light source placement portions 113*a*, respectively. Accordingly, as shown in FIG. 2, multiple light sources 114 also are arranged in a matrix configuration. However, it is not always necessary for the light guide member 113 to be included in the planar light source 111. For example, the planar light source 111 may not include a light guide member, and the multiple light sources 114 may simply be arranged in a matrix configuration on the substrate 112. When no light guide member is included, the light source placement portion refers to a portion of the substrate 112 in which the light source 114 is located.

Each light source 114 may be a single light-emitting element or may include a light-emitting device in which, for example, a wavelength conversion member or the like is combined with a light-emitting element. According to the present embodiment, as shown in FIG. 3, each light source 114 includes a light-emitting element 114*a*, a wavelength conversion member 114*b*, a second light-modulating member 114*h*, and a third light-modulating member 114*i*.

The light-emitting element 114*a* is, for example, an LED (Light-Emitting Diode) and includes a semiconductor stacked body 114*c* and a pair of electrodes 114*d* and 114*e* that electrically connects the semiconductor stacked body 114*c* and the wiring of the substrate 112. Through-holes are provided in portions of the light-reflective sheet 112*s* positioned directly under the electrodes 114*d* and 114*e*. Conductive members 112*m* that electrically connect the substrate 112 and the electrodes 114*d* and 114*e* are located in the through-holes.

The wavelength conversion member 114*b* includes a light-transmitting member 114*f* that covers an upper surface and side surfaces of the semiconductor stacked body 114*c*, and a wavelength conversion substance 114*g* that is located in the light-transmitting member 114*f* and converts the wavelength of the light emitted by the semiconductor stacked body 114*c* into a different wavelength. The wavelength conversion substance 114*g* is, for example, a phosphor.

According to the present embodiment, the light-emitting element 114*a* emits blue light. On the other hand, the wavelength conversion member 114*b* includes, for example, a phosphor that converts incident light into red light (hereinbelow, called a red phosphor) such as a CASN-based phosphor (e.g., $CaAlSiN_3$:Eu), a KSF-based phosphor (e.g., $K_2SiF_6$:Mn), a KSAF-based phosphor (e.g., $K_2(Si, Al)F_6$:Mn), or the like, a phosphor that converts incident light into green light (hereinbelow, called a green phosphor) such as a phosphor that has a perovskite structure (e.g., $CsPb(F, Cl, Br, I)_3$), a β-sialon-based phosphor (e.g., $(Si, Al)_3(O, N)_4$:Eu), a LAG-based phosphor (e.g., $Lu_3(Al, Ga)_5O_{12}$:Ce), etc. Thereby, the backlight 110 can emit white light, which is a combination of the blue light emitted by the light-emitting element 114*a* and the red light and the green light from the wavelength conversion member 114*b*. The wavelength conversion member 114*b* may be a light-transmitting member that does not include any phosphor; in such a case, for example, a similar white light can be obtained by providing a phosphor sheet that includes a red phosphor and a green phosphor on the planar light source.

The second light-modulating member 114*h* is located at an upper surface of the wavelength conversion member 114*b* and can modify the amount and/or the emission direction of the light emitted from the upper surface of the wavelength conversion member 114*b*. The third light-modulating member 114*i* is located at the lower surface of the light-emitting element 114*a* and the lower surface of the wavelength conversion member 114*b* so that the lower surfaces of the electrodes 114*d* and 114*e* are exposed. The third light-modulating member 114*i* can reflect the light oriented toward a lower surface of the wavelength conversion member 114*b* to the upper surface and side surfaces of the wavelength conversion member 114*b*. The second light-modulating member 114*h* and the third light-modulating member 114*i* each can include a light-transmitting resin, a light-diffusing agent included in the light-transmitting resin, etc. The light-transmitting resin is, for example, a silicone resin, an epoxy resin, or an acrylic resin. For example, particles of $TiO_2$, $SiO_2$, $Nb_2O_5$, $BaTiO_3$, $Ta_2O_5$, $Zr_2O_3$, $Y_2O_3$, $Al_2O_3$, ZnO, MgO, $BaSO_4$, glass, etc., are examples of the light-diffusing agent. The second light-modulating member 114*h* may also include a metal member such as, for example, Al, Ag, etc., so that the luminance directly above the light source 114 does not become too high.

The light-transmitting member 115 is located in the light source placement portion 113*a*. The light-transmitting member 115 covers the light source 114. The first light-modulating member 116 is located on the light-transmitting member 115. The first light-modulating member 116 can reflect a portion of the light incident from the light-transmitting member 115 and can transmit another portion of the light so that the luminance directly above the light source 114 does not become too high. The first light-modulating member 116 can include a member similar to the second light-modulating member 114*h* or the third light-modulating member 114*i*.

A partitioning trench 113*b* is provided in the light guide member 113 to surround the light source placement portions 113*a* in top-view. The partitioning trench 113*b* extends in a lattice shape in the X-direction and the Y-direction. The partitioning trench 113*b* extends through the light guide member 113 in the Z-direction. Alternatively, the partitioning trench 112*b* may be a recess provided in the upper surface or the lower surface of the light guide member 113. Also, the partitioning trench 112*b* may not be provided in the light guide member 113. The light-reflecting member 117 is located in the partitioning trench 113*b*. For example, a light-transmitting resin that includes a light-diffusing agent can be used as the light-reflecting member 117. For example, particles of $TiO_2$, $SiO_2$, $Nb_2O_5$, $BaTiO_3$, $Ta_2O_5$, $Zr_2O_3$, ZnO, $Y_2O_3$, $Al_2O_3$, MgO, $BaSO_4$, glass, etc., are examples of the light-diffusing agent. For example, a silicone resin, an epoxy resin, an acrylic resin, etc., are examples of the light-transmitting resin. For example, a metal member such as Al, Ag, etc., may be used as the light-reflecting member 117. The light-reflecting member 117 covers a portion of side surfaces of the partitioning trench 113*b* in a layer shape. Alternatively, the light-reflecting member 117 may fill the entire interior of the partitioning trench 112*b*. Also, no light-reflecting member may be located in the partitioning trench 112*b*.

According to the present embodiment, light emission of the multiple light sources 114 is individually controllable by the driver 120 for the backlight. Here, "controllable light emission" means that switching between lit and unlit is possible, and the luminance in the lit state is adjustable. For example, the planar light source may have a structure in which the light emission is controllable for each light source, or may have a structure in which multiple light source groups are arranged in a matrix configuration, and the light emission is controllable for each light source group.

In the specification, subdivided regions of the planar light source each of which includes a light source or light source group that are individually controllable are called "light-emitting regions". In other words, the light-emitting region means the minimum region of the backlight of which the luminance is controllable by local dimming. Accordingly, according to the present embodiment, similarly to the partitioning trench 113*b*, the regions of the planar light source 111 partitioned into a lattice shape correspond to light-emitting regions 110*s*.

Each light-emitting region 110*s* is rectangular. According to the present embodiment, one light source 114 is located in one light-emitting region 110*s*. Then, the luminances of the multiple light-emitting regions 110*s* are individually controlled by the driver 120 for the backlight individually controlling the light emission of the multiple light sources 114. As described above, when the light emission is controlled for each of multiple light source groups, one light source group, i.e., multiple light sources, is located in one light-emitting region; and the multiple light sources are simultaneously lit or unlit.

The multiple light-emitting regions 110*s* are arranged in a matrix configuration in top-view. Hereinbelow, in the structure of a matrix configuration such as that of the multiple light-emitting regions 110*s*, the element group of the matrix of the light-emitting region 110*s*, etc., arranged in the X-direction is called a "row"; and the element group of the matrix of the light-emitting region 110*s*, etc., arranged in the Y-direction is called a "column". For example, as shown in FIG. 2, the row that is positioned furthest in the +Y direction (the row positioned uppermost when viewed according to a direction of reference numerals) is referred to as the "first row"; and the row that is positioned furthest in the −Y direction (the row positioned lowermost when viewed according to the direction of reference numerals) is referred to as the "final row". Similarly, as shown in FIG. 2, the column that is positioned furthest in the −X direction (the column positioned leftmost when viewed according to the direction of reference numerals) is referred to as the "first column"; and the column that is positioned furthest in the +X direction (the column positioned rightmost when viewed according to the direction of reference numerals) is referred to as the "final column". The multiple light-emitting regions 110*s* are arranged in N1 rows and M1 columns. Here, N1 and M1 each are any integer; an example is shown in FIG. 2 in which N1 is 8 and M1 is 16.

Although the partitioning trench 113*b* and the light-reflecting member 117 are included in the planar light source 111 as shown in FIG. 3, the adjacent light-emitting regions 110*s* are not perfectly shielded. Therefore, light can propagate between the adjacent light-emitting regions 110*s*. Accordingly, the light that is emitted by the light source 114 in one light-emitting region 110*s* when the light source is lit may propagate to the adjacent light-emitting regions 110*s* at the periphery of the one light-emitting region 110*s*.

As shown in FIG. 1, the driver 120 for the backlight is connected to the substrate 112 and the controller 150. The driver 120 for the backlight includes a drive circuit that drives the multiple light sources 114. The driver 120 for the backlight adjusts the luminances of the light-emitting regions 110*s* according to backlight control data SG1 received from the controller 150.

Figure 4:
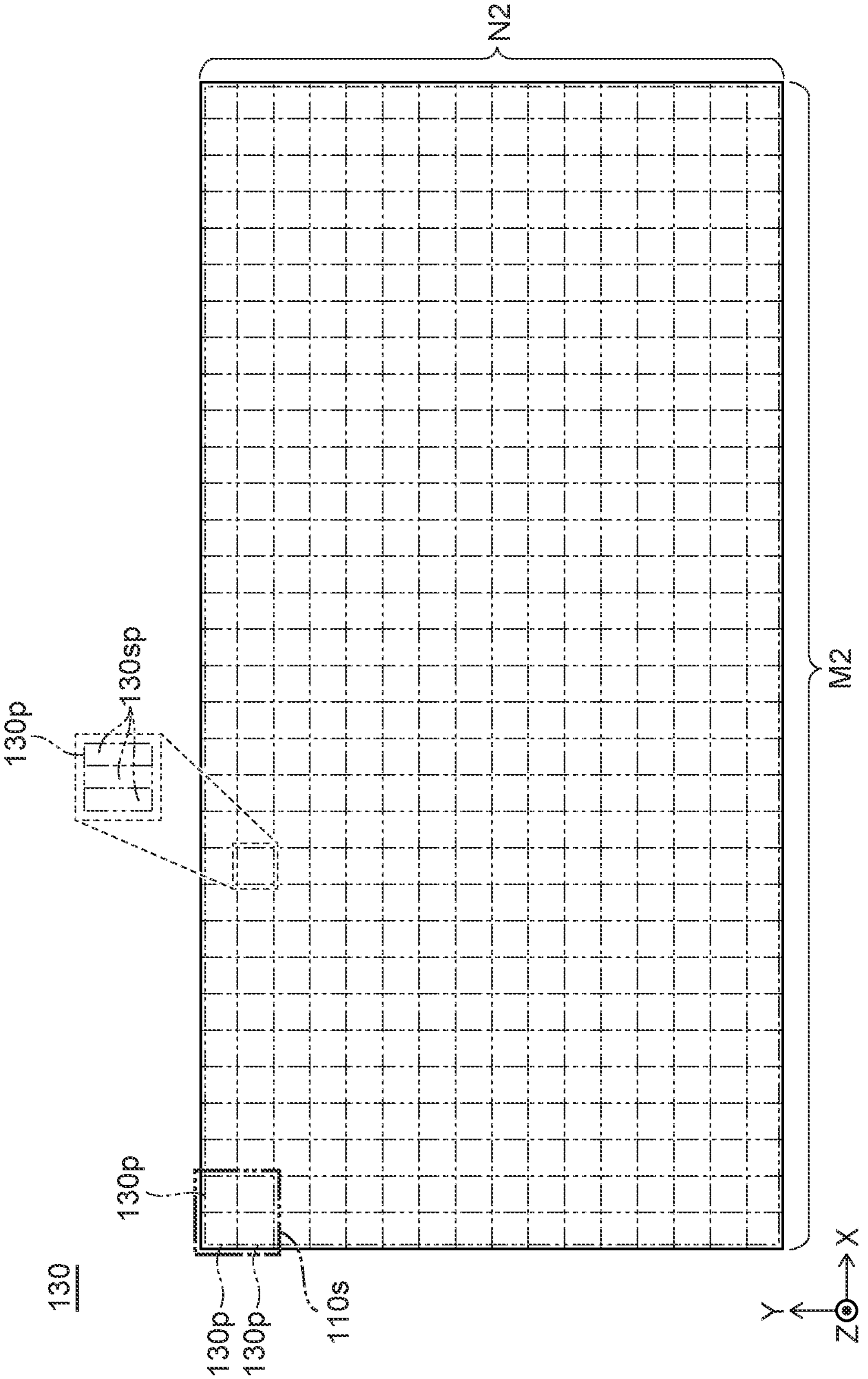
FIG. 4 illustrates a top view of a liquid crystal panel of the image display device according to the first embodiment.

FIG. 4 illustrates a top view of the liquid crystal panel 130 of the image display device 100 according to the first embodiment.

The liquid crystal panel 130 is located on the backlight 110. According to the present embodiment, the liquid crystal panel 130 is substantially rectangular in top-view. The liquid crystal panel 130 includes multiple pixels 130*p* arranged in a matrix configuration. In FIG. 4, one region that is surrounded with a double dot-dash line corresponds to one pixel 130*p*.

The liquid crystal panel 130 according to the present embodiment can display a color image. To achieve this objective, one pixel 130*p* includes three subpixels 130*sp* such that, for example, the white light emitted from the backlight 110 is transmitted to a subpixel that is configured to transmit blue light, a subpixel that is configured to transmit green light, and a subpixel that is configured to transmit red light. The light transmittances of the subpixels 130*sp* are individually controllable by the driver 140 for the liquid crystal panel. The gradations of the subpixels 130*sp* are individually controlled thereby.

The multiple pixels 130*p* are arranged in N2 rows and M2 columns. Here, N2 and M2 each are any integer such that N2>N1 and M2>M1. The multiple pixels 130*p* are located in the light-emitting regions 110*s* in top-view. Although an example shown in FIG. 4 demonstrates that four pixels 130*p* correspond to one light-emitting region 110*s*, the number of the pixels 130*p* that correspond to one light-emitting region 110*s* may be less than four or more than four.

As shown in FIG. 1, the driver 140 for the liquid crystal panel is connected to the liquid crystal panel 130 and the controller 150. The driver 140 for the liquid crystal panel includes a drive circuit of the liquid crystal panel 130. The driver 140 for the liquid crystal panel adjusts gradations of the pixels 130*p* according to liquid crystal panel control data SG2 received from the controller 150.

Figure 5:
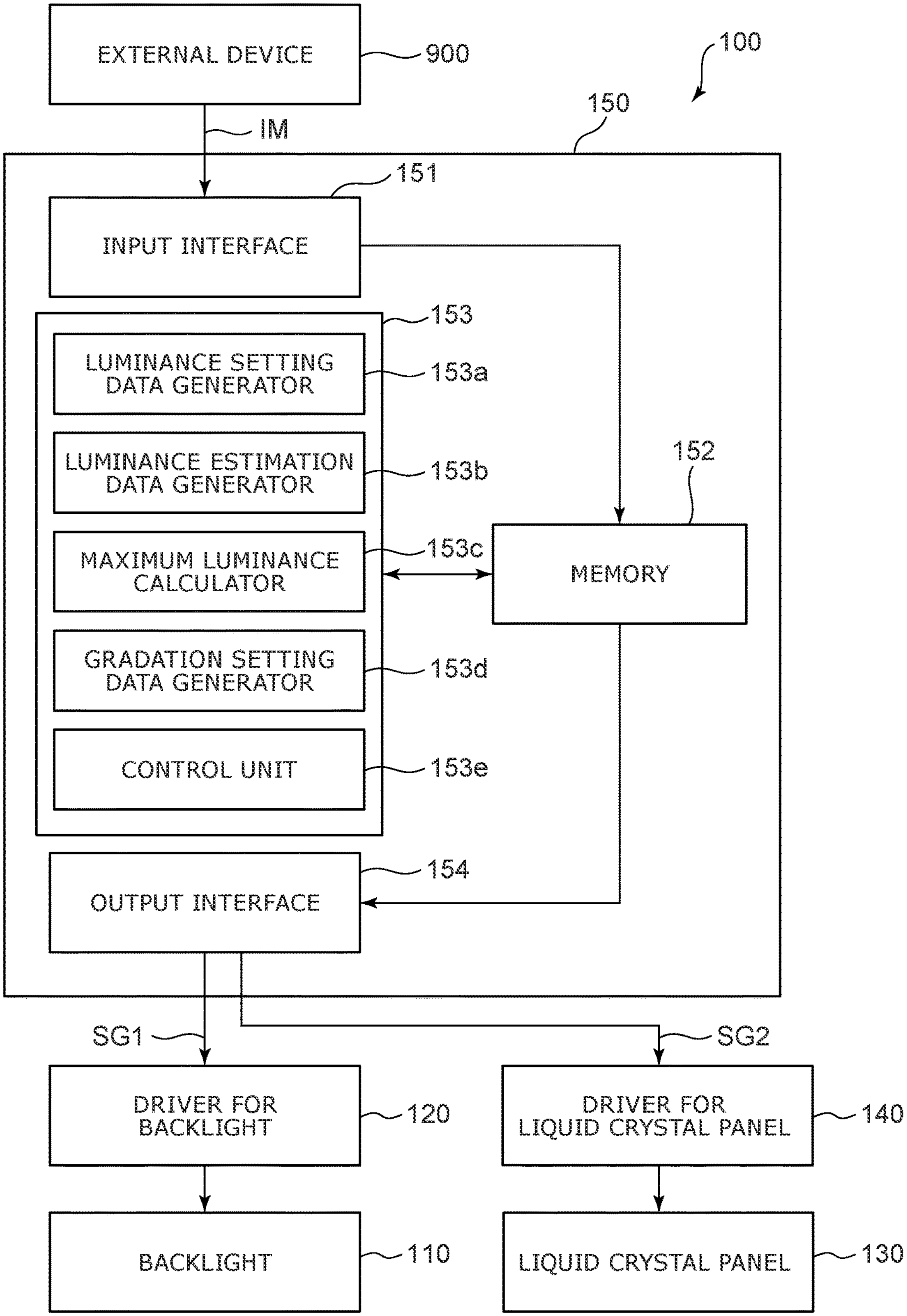
FIG. 5 is a block diagram showing components of the image display device according to the first embodiment.

FIG. 5 is a block diagram showing components of the image display device 100 according to the first embodiment.

According to the first embodiment, the controller 150 includes an input interface 151, memory 152, a processor 153 such as a CPU (central processing unit) or the like, and an output interface 154. These components are connected to each other by a bus.

For example, the input interface 151 is connected to an external device 900 such as a tuner, a personal computer, a game machine, etc. The input interface 151 includes, for example, a connection terminal to the external device 900 such as a HDMI® (High-Definition Multimedia Interface) terminal, etc. The external device 900 inputs an input image IM to the controller 150 via the input interface 151.

The memory 152 includes, for example, ROM (Read-Only Memory), RAM (Random-Access Memory), etc. The memory 152 stores various programs, various parameters, and various data for displaying an image in the liquid crystal panel.

By reading the programs stored in the memory 152, the processor 153 processes the input image IM, determines setting values of luminances of the light-emitting regions 110*s* of the backlight 110 and setting values of the gradations of the pixels 130*p* of the liquid crystal panel 130, and controls the backlight 110 and the liquid crystal panel 130 based on these setting values. Thereby, an image that corresponds to the input image IM is displayed on the liquid crystal panel 130. The processor 153 includes a luminance setting data generator 153*a*, a luminance estimation data generator 153*b*, a maximum luminance calculator 153*c*, a gradation setting data generator 153*d*, and a control unit 153*e*.

The output interface 154 is connected to the driver 120 for the backlight. Also, the output interface 154 includes, for example, a connection terminal of the driver 140 for the liquid crystal panel such as a HDMI® terminal, etc., and is connected to the driver 140 for the liquid crystal panel. The driver 120 for the backlight receives the backlight control data SG1 via the output interface 154. The driver 140 for the liquid crystal receives the liquid crystal panel control data SG2 via the output interface 154.

An image display method that uses the image display device 100 according to the present embodiment will be described hereinafter. Functions of the processor 153 as the luminance setting data generator 153*a*, the luminance estimation data generator 153*b*, the maximum luminance calculator 153*c*, the gradation setting data generator 153*d*, and the control unit 153*e* also will be described.

Figure 6:
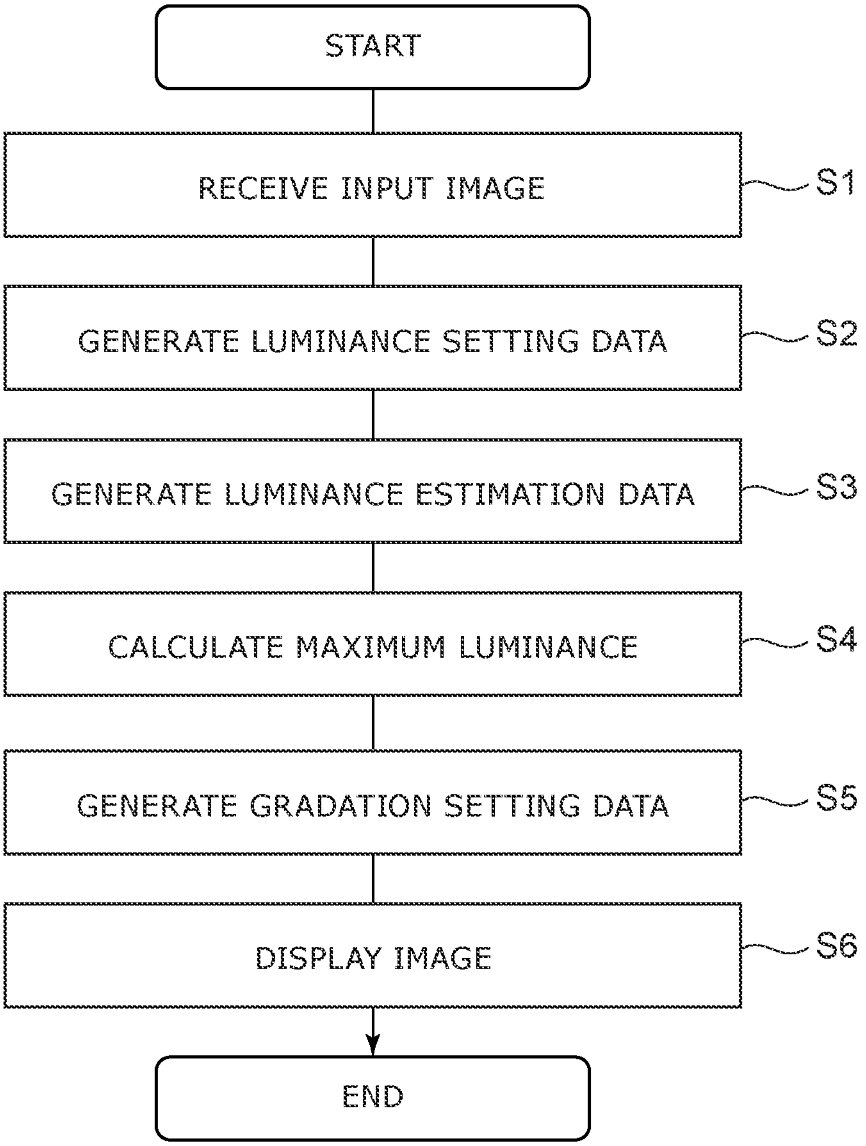
FIG. 6 is a flowchart showing an image display method according to the first embodiment.

FIG. 6 is a flowchart showing the image display method according to the first embodiment.

The image display method according to the first embodiment includes an acquisition process S1 of the input image IM, a generation process S2 of luminance setting data D1, a generation process S3 of luminance estimation data D2, a calculation process S4 of a maximum luminance e2max, a generation process S5 of gradation setting data D3, and a display process S6 of the image on the liquid crystal panel 130. The processes will now be elaborated. A method of displaying an image corresponding to one input image IM on the liquid crystal panel 130 will be described. When the input images IM are sequentially input to the controller 150 and images that correspond to the input images IM are sequentially displayed on the liquid crystal panel 130, the following processes S1 to S6 are repeatedly performed.

First, the acquisition process S1 of the input image IM will be described.

As shown in FIG. 5, the input interface 151 of the controller 150 receives the input image IM from the external device 900. The received input image IM is stored in the memory 152.

Figure 7:
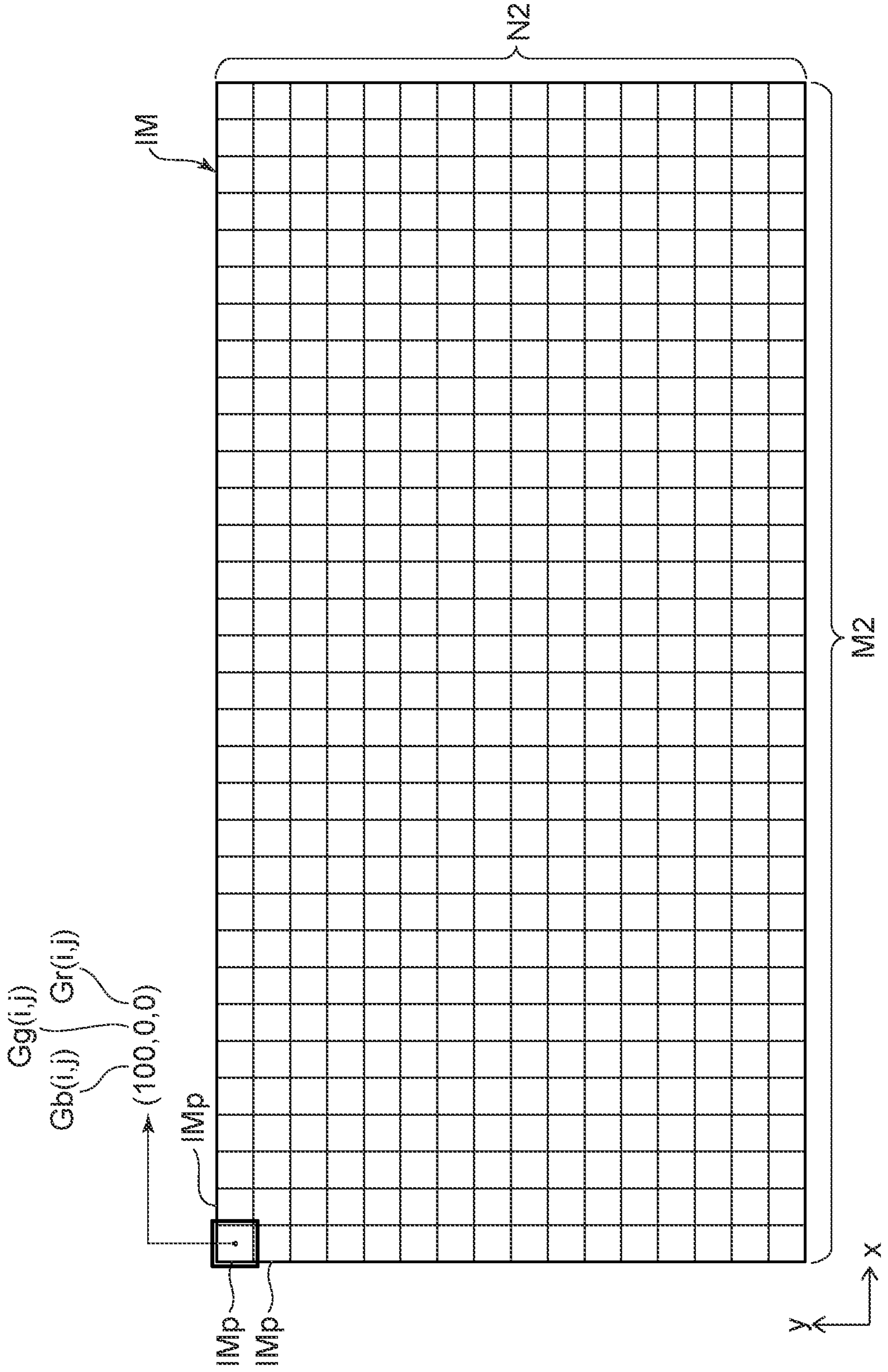
FIG. 7 is a schematic diagram showing an input image that is input to a controller of the image display device according to the first embodiment.

FIG. 7 is a schematic diagram showing the input image that is input to the controller 150 of the image display device 100 according to the first embodiment.

Figure 8:
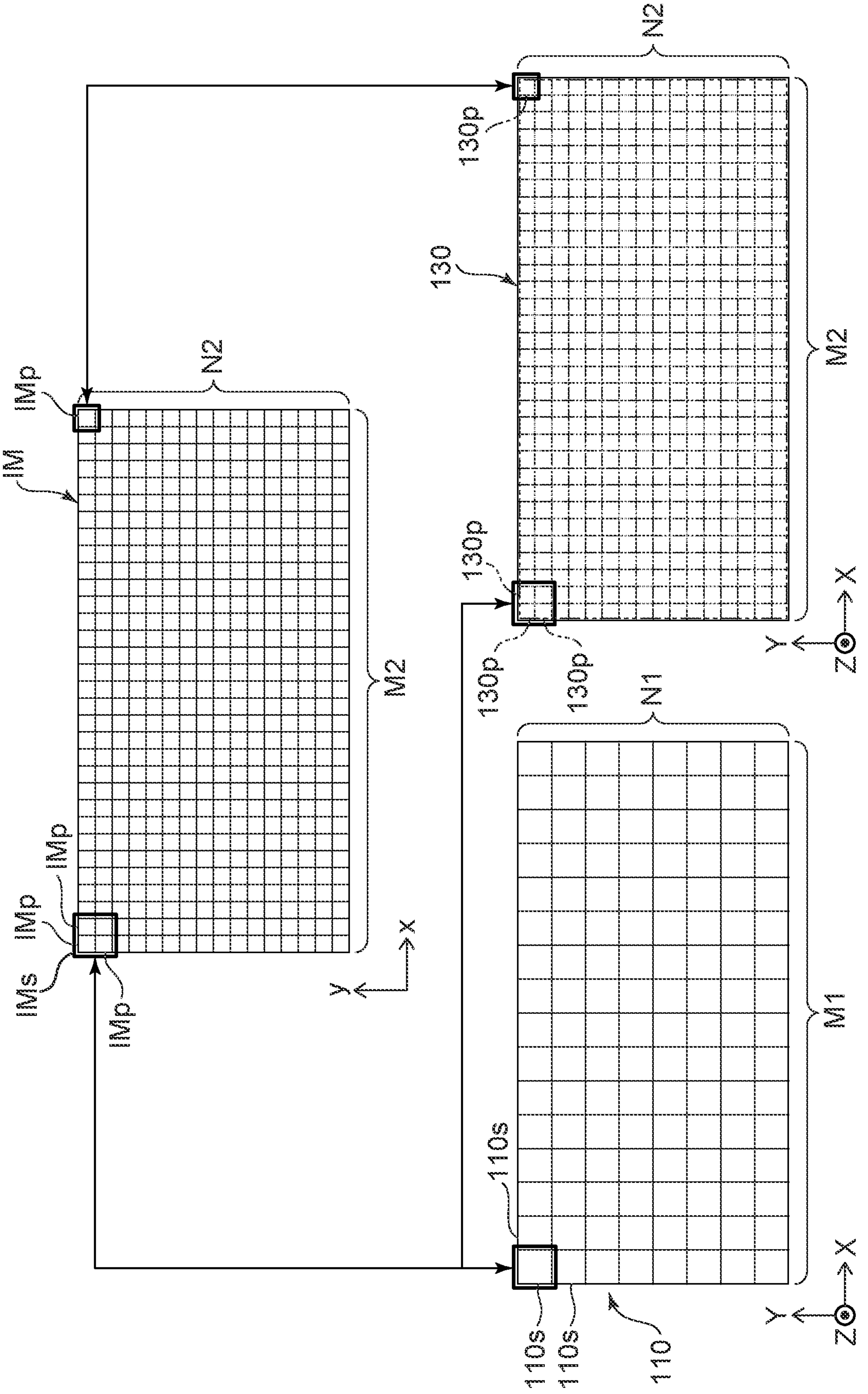
FIG. 8 is a schematic diagram showing a relationship among pixels of the liquid crystal panel, light-emitting regions of the backlight, and pixels of the input image in the first embodiment.

FIG. 8 is a schematic diagram showing a relationship among the pixels of the liquid crystal panel, the light-emitting regions of the backlight, and pixels of the input image in the first embodiment.

The input image IM includes multiple pixels (may be referred to as "image pixels") IMp arranged in a matrix configuration. For easier understanding of the following description, for example, the arrangement directions of the elements are represented using a xy orthogonal coordinate system for data in which elements such as the pixels IMp or the like are arranged in a matrix configuration as in the input image IM. The x-axis direction in the direction of the arrow is referred to as the "+x direction"; and the opposite direction is referred to as the "−x direction". Similarly, the y-axis direction in the direction of the arrow is referred to as the "+y direction"; and the opposite direction is referred to as the "−y direction". Also, hereinbelow, the element groups of the matrix that are arranged in the x-direction are referred to a "row"; and the element groups of the matrix that are arranged in the y-direction are referred to a "column". For example, as shown in FIG. 7, the row that is positioned furthest in the +y direction (the row positioned uppermost when viewed according to a direction of reference numerals) is referred to as the "first row"; and the row that is positioned furthest in the −y direction (the row positioned lowermost when viewed according to the direction of reference numerals) is referred to as the "final row". Similarly, as shown in FIG. 7, the column that is positioned furthest in the −x direction (the column positioned leftmost when viewed according to the direction of reference numerals) is referred to as the "first column"; and the column that is positioned furthest in the +x direction (the column positioned rightmost when viewed according to the direction of reference numerals) is referred to as the "final column".

For easier understanding of the following description, an example is described in which one pixel IMp of the input image IM corresponds to one pixel 130*p* of the liquid crystal panel 130 as shown in FIG. 8. In other words, according to the present embodiment, the multiple pixels IMp are arranged in N2 rows and M2 columns. Then, multiple pixels IMp are included in an image area IMs of the input image IM that corresponds to one light-emitting region 110*s* of the backlight 110. However, the correspondence between the pixels of the input image and the pixels of the liquid crystal panel may not be one-to-one. In such a case, the processor 153 of the controller 150 performs the following processing after performing preprocessing of the input image so that the pixels of the input image and the pixels of the liquid crystal panel correspond one-to-one.

A gradation value is set to each of the pixels 130*p*. According to the present embodiment, the input image IM is a color image. Therefore, as shown in FIG. 7, a blue gradation Gb(i, j), a green gradation Gg(i, j), and a red gradation Gr(i, j) are set for the pixel IMp positioned at the ith row and the jth column. Here, i is any integer from 1 to N2, and j is any integer from 1 to M2. The gradation values Gb(i, j), Gg(i, j), and Gr(i, j) are, for example, numerals from 0 to 255 when represented by 8 bits.

The generation process S2 of the luminance setting data D1 will now be described.

Figure 9:
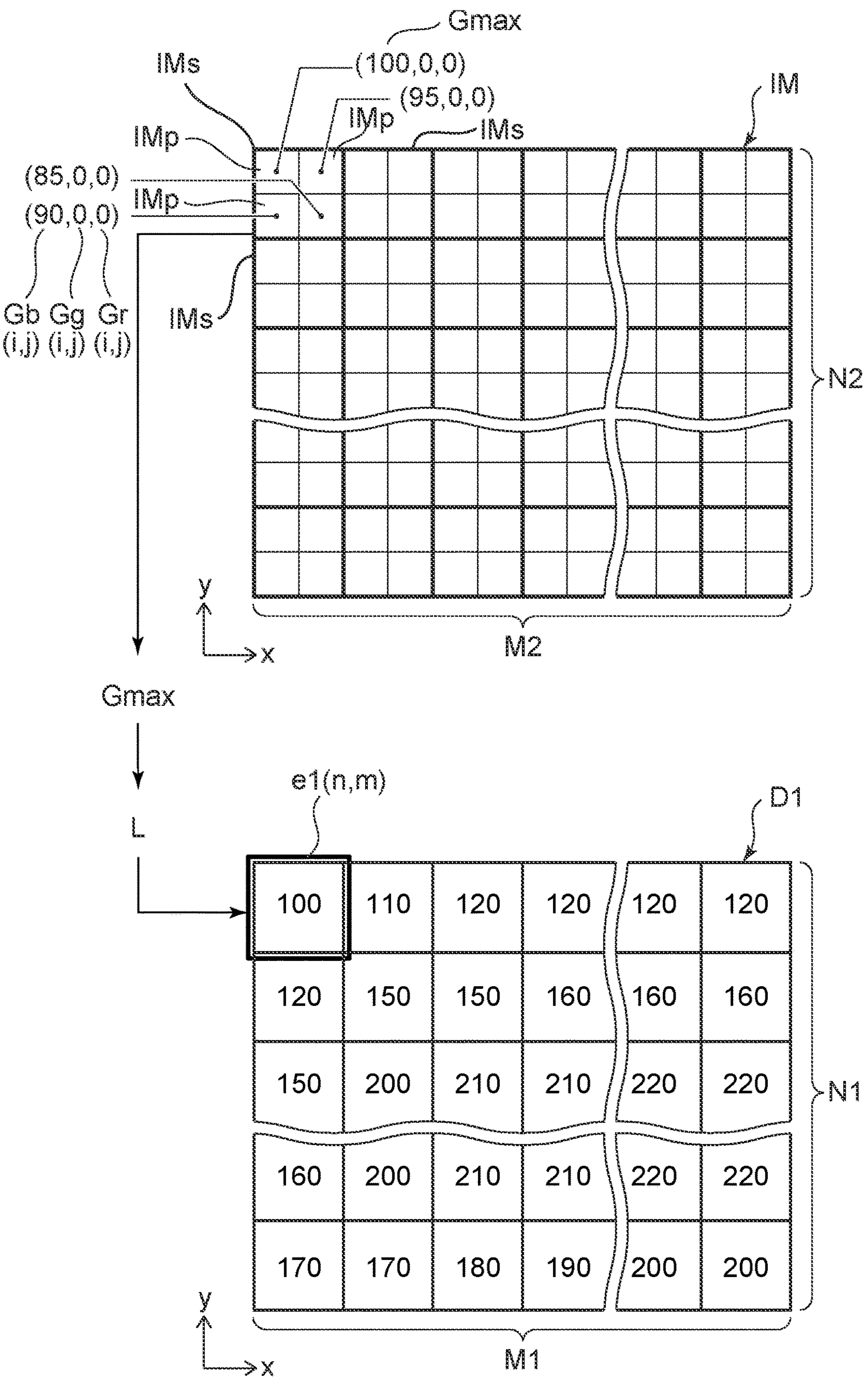
FIG. 9 is a schematic diagram showing a process of generating luminance setting data in the image display method according to the first embodiment.

FIG. 9 is a schematic diagram showing a process of generating the luminance setting data in the image display method according to the first embodiment.

The luminance setting data generator 153*a* generates luminance setting data D1 including a luminance L converted from a maximum gradation Gmax of the gradations Gb(i, j), Gg(i, j), and Gr(i, j) of the multiple pixels IMp with respect to each image area IMs of the input image IM corresponding to one light-emitting region 110*s*.

A specific example of the process of generating the luminance setting data D1 will now be described.

First, the luminance setting data generator 153*a* determines an image area IMs that corresponds to the light-emitting region 110*s* positioned at the nth row and the mth column. Because one image area IMs corresponds to one light-emitting region 110*s*, the multiple image areas IMs are arranged in N1 rows and M1 columns in the input image IM. Accordingly, n is any integer from 1 to N1, and m is any integer from 1 to M1. Then, the luminance setting data generator 153*a* uses the maximum value of the blue gradations Gb(i, j), the green gradations Gg(i, j), and the red gradations Gr(i, j) of all pixels IMp included in the image area IMs as the maximum gradation Gmax of the image area IMs. Then, the luminance setting data generator 153*a* converts the maximum gradation Gmax into the luminance L. Then, the luminance setting data generator 153*a* uses the luminance L as a value of an element e1(*n, m*) at the nth row and the mth column of the luminance setting data D1.

The luminance setting data generator 153*a* performs this processing for all of the image areas IMs.

The luminance setting data D1 thus obtained is data of a matrix configuration that includes N1 rows and M1 columns. The value of the element e1(*n, m*) of the luminance setting data D1 at the nth row and the mth column is the luminance L converted from the maximum gradation Gmax of the image area IMs positioned at the nth row and the mth column. The value of the element e1(*n, m*) of the luminance setting data D1 at the nth row and the mth column is the setting value of the luminance of the light-emitting region 110*s* positioned at the nth row and the mth column.

The luminance setting data generator 153*a* stores the luminance setting data D1 in the memory 152.

Although a specific example of the process of generating the luminance setting data D1 is described above, the process of generating the luminance setting data D1 is not limited to that described above. For example, the luminance setting data generator 153*a* may use a value obtained by correcting the aforementioned luminance L as the value of the element e1(*n, m*) of the luminance setting data D1.

Figure 10:
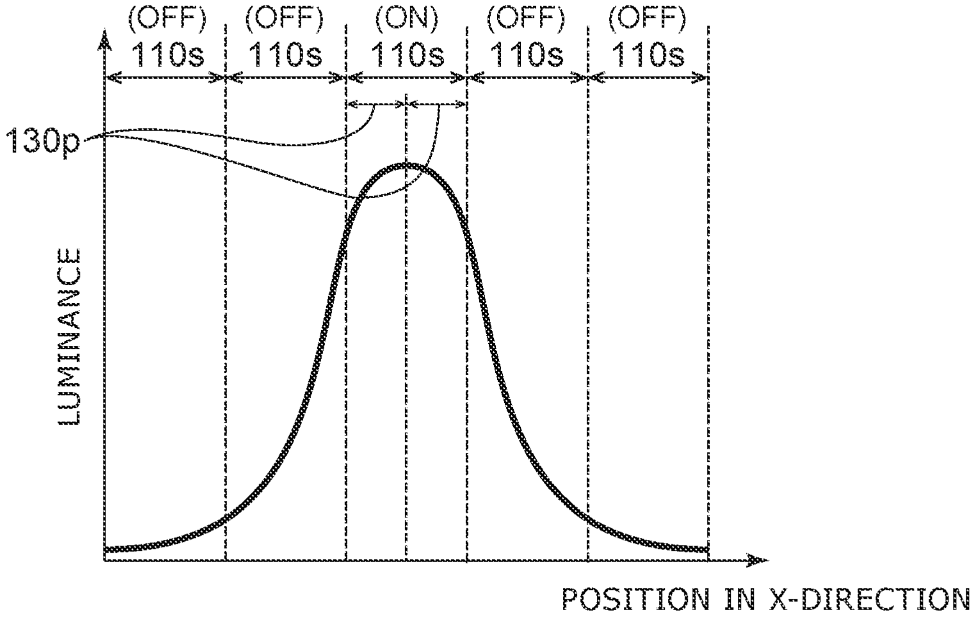
FIG. 10 is a graph showing a luminance profile when a light source in one light-emitting region is lit in the backlight of the image display device according to the first embodiment.

FIG. 10 is a graph showing a luminance profile when a light source in one light-emitting region is lit in the backlight of the image display device according to the first embodiment. In FIG. 10, the horizontal axis is the position in the X-direction, and the vertical axis is the luminance.

In FIG. 10, the light-emitting region 110*s* in which the light source 114 is lit is shown as ON, and the light-emitting regions 110*s* in which the light sources 114 are unlit are shown as OFF.

When the light source 114 in one light-emitting region 110*s* is lit, the luminance in the light-emitting region 110*s* may not be uniform in the XY plane as shown in FIG. 10. Specifically, according to present the embodiment, because the center of the light source 114 is positioned at substantially the center of the light-emitting region 110*s* in top-view, the luminance decreases as departing away from the center of the light-emitting region 110*s*. Accordingly, although multiple pixels 130*p* of the liquid crystal panel 130 are located on one light-emitting region 110*s*, the luminances directly under these pixels 130*p* may not be the same.

In the planar light source 111 according to the present embodiment, the adjacent light-emitting regions 110*s* are not perfectly shielded. Therefore, when the light source 114 in one light-emitting region 110*s* of the backlight 110 is lit, the light emitted from the light source 114 may propagate to neighboring light-emitting regions 110*s* at the periphery of the one light-emitting region 110*s*. For that reason, the luminances of the light-emitting regions 110*s* are not the values set by the luminance setting data D1, but are affected by light emitted by the light sources 114 in the neighboring light-emitting regions 110*s*.

To address such an issue, according to the present embodiment, the luminance estimation data D2 including estimated luminances directly under the pixels 130*p*, which are generated based on the luminance profile of the light source 114 in one light-emitting region 110*s* and the effects of the light emitted by the light sources 114 in the neighboring light-emitting regions 110*s* is generated. Then, the gradation setting data D3 including the setting values of the gradations of the pixels 130*p* of the liquid crystal panel 130 is generated based on the luminance estimation data D2.

A specific example of the generation process S3 of the luminance estimation data D2 will now be elaborated.

Figure 11:
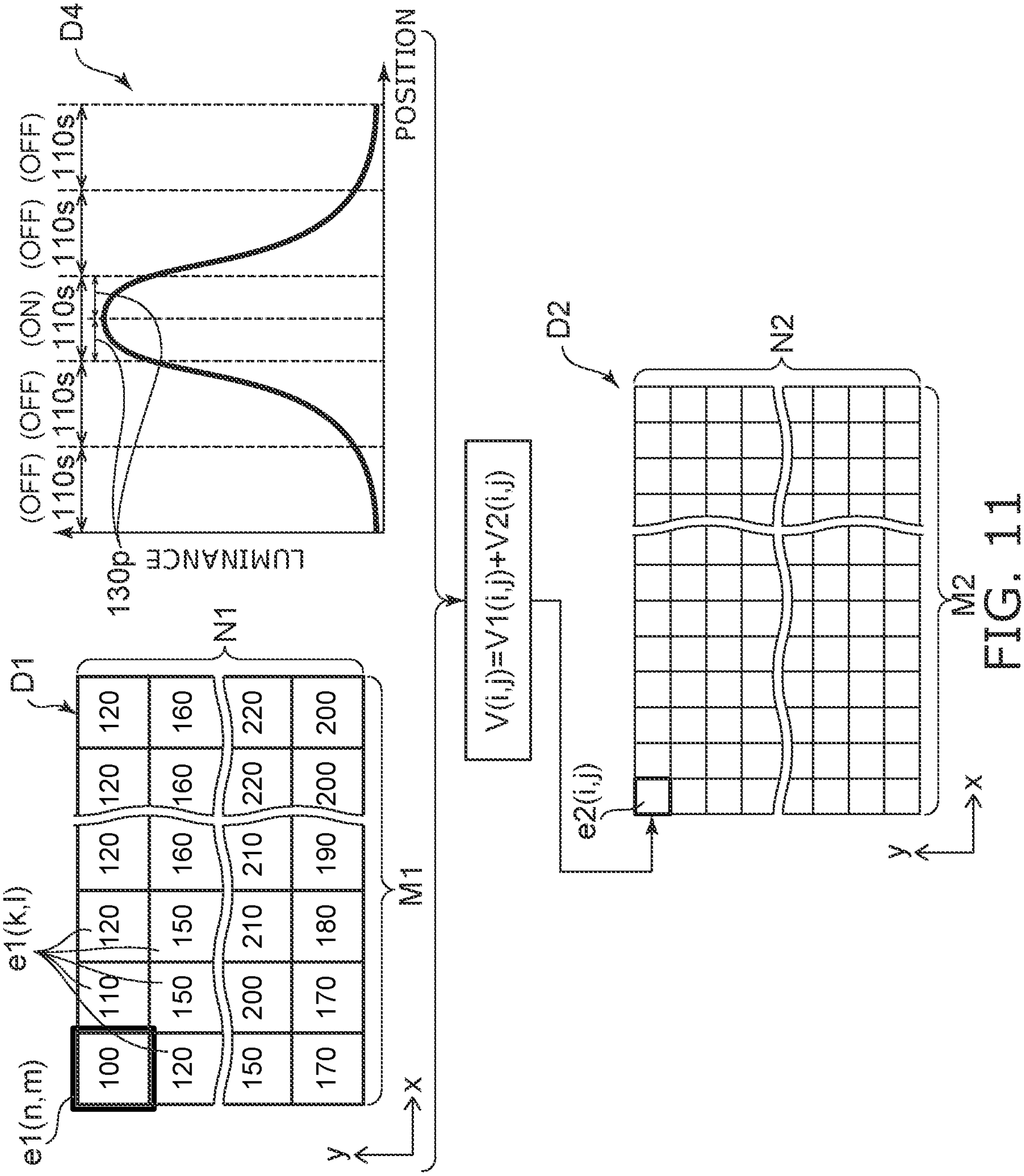
FIG. 11 is a schematic diagram showing a process of generating luminance estimation data in the image display method according to the first embodiment.

FIG. 11 is a schematic diagram showing a process of generating the luminance estimation data in the image display method according to the first embodiment.

According to the first embodiment, the memory 152 pre-stores a luminance profile D4 indicating luminance distribution in the XY plane when the light source 114 in one light-emitting region 110*s* is lit.

First, the luminance estimation data generator 153*b* estimates a luminance V(i, j) directly under the pixel 130*p* positioned at the ith row and the jth column of the liquid crystal panel 130 from the luminance setting data D1 and the luminance profile D4.

Specifically, the luminance estimation data generator 153*b* estimates a luminance V1(*i, j*) directly under the pixel 130*p* when only the light source 114 in the light-emitting region 110*s* is lit from the luminance profile D4 and the value (the setting value of the luminance) of the element e1(*n, m*) corresponding to the light-emitting region 110*s* positioned directly under the pixel 130*p* in the luminance setting data D1. The luminance estimation data generator 153*b* also estimates a luminance V2(*i, j*) directly under the pixel 130*p* when only the light sources 114 in the neighboring light-emitting regions 110*s* are lit from the luminance profile D4 and the values of the elements e1(*k, l*) corresponding to the light-emitting regions 110*s* at the periphery of the light-emitting region 110*s* in the luminance setting data D1. Here, k is any integer from 1 to N1, and/is any integer from 1 to M1. Then, the sum of the luminances V1(*i, j*) and V2(*i, j*) is estimated to be the luminance V(i, j) directly under the pixel 130*p*. Thereby, the luminance estimation data generator 153*b* can estimate the luminance V(i, j) directly under the pixel 130*p* by including both the luminance distribution in the one light-emitting region 110*s* and the light leakage from the light-emitting regions 110*s* at the periphery.

The luminance estimation data generator 153*b* uses the calculated luminance V(i, j) as the value of an element e2(*i, j*) at the ith row and the jth column of the luminance estimation data D2. The luminance estimation data generator 153*b* performs the aforementioned processing for all pixels 130*p* of the liquid crystal panel 130.

The luminance estimation data D2 thus obtained is data of a matrix configuration that includes N2 rows and M2 columns. The value of the element e2(*i, j*) of the luminance estimation data D2 at the ith row and the jth column is the estimated value of the luminance directly under the pixel 130*p* positioned at the ith row and the jth column of the liquid crystal panel 130.

The luminance estimation data generator 153*b* stores the luminance estimation data D2 in the memory 152.

Although a specific example of the process of generating the luminance estimation data D2 is described above, the process of generating the luminance estimation data D2 is not limited to that described above. For example, based on the luminance setting data D1 and the luminance profile D4, the luminance estimation data generator 153*b* may generate a map that estimates the luminance distribution directly under all pixels 130*p* of the liquid crystal panel 130 when the backlight 110 is driven based on the luminance setting data D1. Then, the luminance estimation data generator 153*b* may generate the luminance estimation data D2 based on the generated map.

The calculation process S4 of the maximum luminance e2max will now be described.

Figure 12:
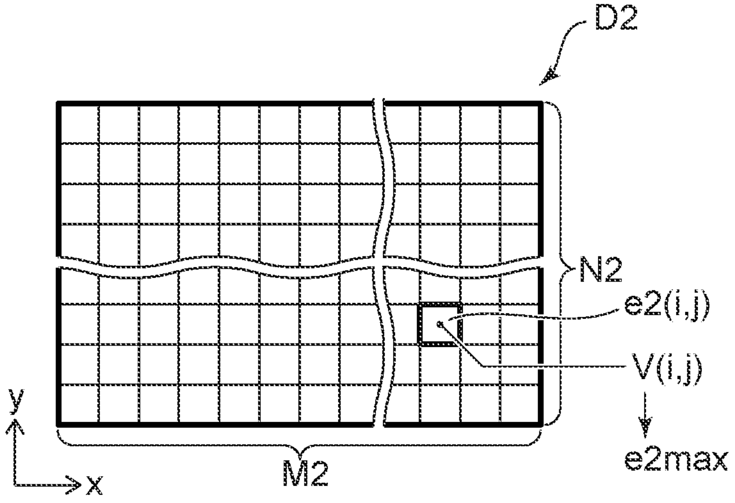
FIG. 12 is a schematic diagram showing a process of calculating maximum luminance in the image display method according to the first embodiment.

FIG. 12 is a schematic diagram showing a process of calculating maximum luminance in the image display method according to the first embodiment.

The maximum luminance calculator 153*c* uses the maximum value among all of the luminances V(i, j) included in the luminance estimation data D2 as the maximum luminance e2max(which is a scalar value). The maximum luminance calculator 153*c* stores the maximum luminance e2max in the memory 152.

The generation process S5 of the gradation setting data D3 will now be described.

Figure 13:
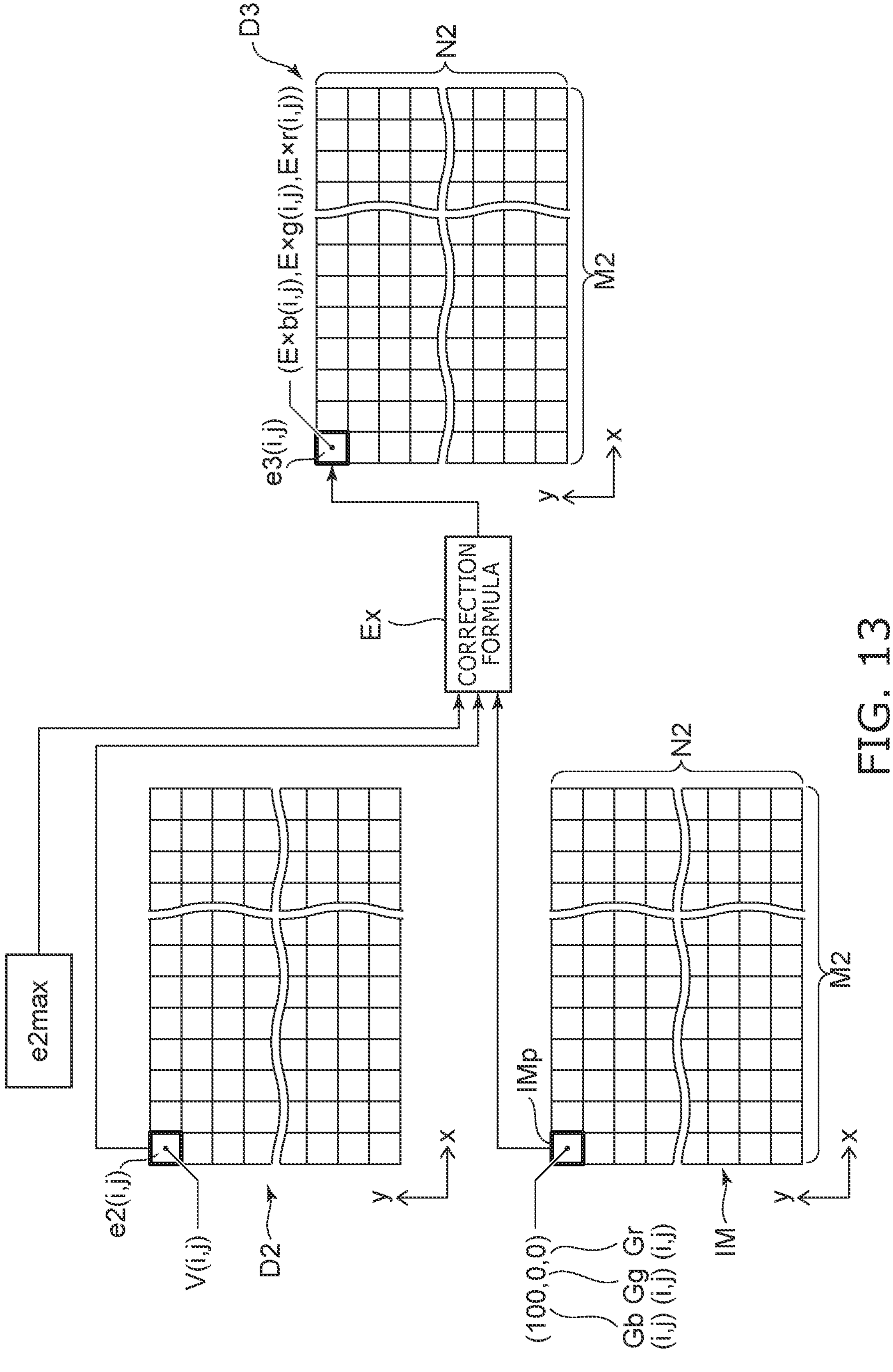
FIG. 13 is a schematic diagram showing a process of generating gradation setting data in the image display method according to the first embodiment.

FIG. 13 is a schematic diagram showing a process of generating the gradation setting data in the image display method according to the first embodiment.

As shown in FIG. 13, the gradation setting data generator 153*d* generates the gradation setting data D3 including the setting values of the gradations of the pixels 130*p* of the liquid crystal panel 130 by correcting the gradations Gb(i, j), Gg(i, j), and Gr(i, j) of the pixels IMp of the input image IM based on the luminance estimation data D2 and the maximum luminance e2max.

A specific example of the process of generating the gradation setting data D3 will now be described.

Figure 14A:
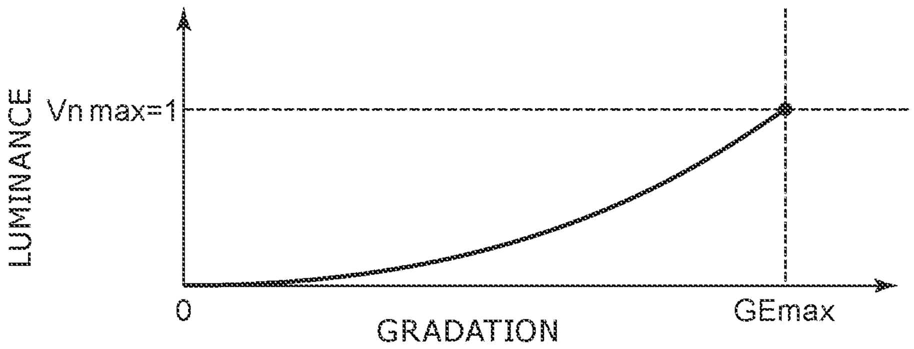
FIG. 14A is a graph showing a relationship between gradation and normalized luminance, when a maximum value of the normalized luminance is 1.

FIG. 14A is a graph showing a relationship between the gradation and the normalized luminance when the maximum value of the normalized luminance is 1. The normalized luminance is converted into the gradation based on a gamma correction conversion formula. In FIG. 14A and the following FIGS. 14B and 14C, the vertical axis is the normalized luminance, and the horizontal axis is the gradation after the conversion.

Figure 14B:
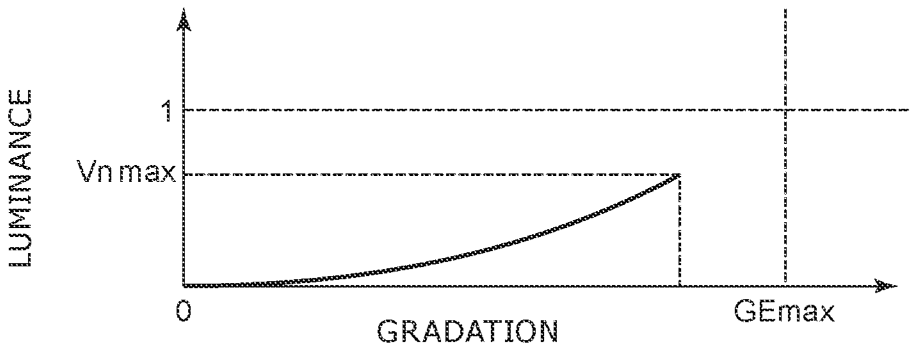
FIG. 14B is a graph showing a relationship between gradation and normalized luminance, when a maximum value of the normalized luminance is less than 1.

FIG. 14B is a graph showing a relationship between the gradation and the normalized luminance when the maximum value of the normalized luminance is less than 1.

Figure 14C:
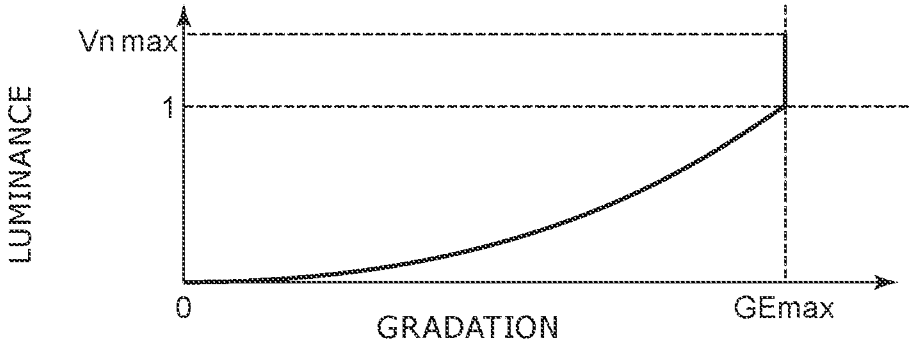
FIG. 14C is a graph showing a relationship between gradation and normalized luminance, when a maximum value of the normalized luminance is greater than 1.

FIG. 14C is a graph showing a relationship between the gradation and the normalized luminance when the maximum value of the normalized luminance is greater than 1.

When correcting the gradations Gb(i, j), Gg(i, j), and Gr(i, j) of the pixels IMp of the input image IM based on the luminance estimation data D2, it is necessary to convert luminances V(i, j) of the luminance estimation data D2 into a gradation Ga(i, j). It is known that a luminance Vn(i, j) that is normalized by dividing the luminance V(i, j) by a prescribed value Vo can be converted into the gradation Ga(i, j) using a conversion formula Gf based on the gamma correction shown below.

[Formula 1]

conversion formula $Gf$ based on gamma correction $Gf$:

$$Ga(i,j) = Vn(i,j)^{Gamma} \times GE\max = \left(\frac{V(i,j)}{Vo}\right)^{Gamma} \times GE\max$$

$Ga(i, j)$: converted gradation $Vn(i, j)$: normalized luminance $V(i, j)$: luminance of element $e2$ positioned at $ith$ row and $jth$ column of luminance estimation data D2

$Vo$: prescribed value

Gamma: constant $GE$max: maximum possible value of gradation

The gamma correction conversion formula Gf is a formula such that the converted gradation Ga(i, j) is the maximum possible value for the gradation Ga, i.e., a maximum value GEmax, when the value of the normalized luminance Vn(i, j) is 1. The maximum possible value GEmax for the gradation is, for example, 255 when the gradation Ga is represented by 8 bits, that is, when represented by a numeral from 0 to 255. Accordingly, when it is desirable to convert the luminance V(i, j) in the luminance estimation data D2 into the gradation Ga(i, j), a maximum value Vnmax of the normalized luminance Vn(i, j) can be 1 as shown in FIG. 14A by setting the prescribed value Vo to the maximum luminance e2max. As a result, the maximum value Vnmax can be converted into the maximum possible value GEmax for the gradation Ga. In other words, the gradation Ga(i, j) after the conversion enable use of the maximum possible range of 0 to GEmax for the gradation Ga(i, j).

However, the maximum luminance e2max may change depending on the input image IM. Conventionally, since the maximum luminance e2max of each input image IM is unknown, the prescribed value Vo is set to a constant value.

For that reason, depending on the input image IM, the maximum luminance e2max directly under the liquid crystal panel 130 may become less than the prescribed value Vo. In such a case, the maximum value Vnmax of the normalized luminance Vn(i, j) drops below 1. As a result, as shown in FIG. 14B, the original possible range of 0 to GEmax may not be fully used for the gradation Ga(i, j).

Also, depending on the input image IM, the maximum luminance e2max directly under the liquid crystal panel 130 may become greater than the prescribed value Vo. In such a case, the maximum value Vnmax of the normalized luminance Vn(i, j) exceeds 1. The gradation Ga(i, j) after the conversion cannot be a value that is greater than the maximum value GEmax. Therefore, when the normalized luminance Vn is greater than 1, the gradation Ga(i, j) after the conversion is rounded to GEmax as shown in FIG. 14C. Thus, when the maximum luminance e2max directly under the liquid crystal panel 130 is greater than the prescribed value Vo, the difference between the luminances V(i, j) that are greater than the prescribed value Vo can no longer be represented in the gradation Ga(i, j) after the conversion.

To address such an issue, in the image display method according to the present embodiment, the luminance V(i, j) that is included in the luminance estimation data D2 is normalized using the maximum luminance e2max. In other words, in the conversion formula Gf, Vo=e2max. Then, the input image IM is corrected based on the normalized luminance V(i, j)/e2max by dividing the luminance V(i, j) by the maximum luminance e2max.

Specifically, first, the gradation setting data generator 153*d* inputs the maximum luminance e2max, the luminance V(i, j) of the element e2(*i, j*) at the ith row and the jth column in the luminance estimation data D2, and the blue gradation Gb(i, j) of the pixel IMp at the ith row and the jth column in the input image IM into a correction formula Ex that is based on the conversion formula Gf.

[Formula 2]

correction formula $Ex$: $Exb(i, j) =$ $$Gb(i,j) \times \frac{1}{Ga(i,j)/GE\max} = Gb(i,j) \times \frac{1}{\left(\frac{V(i,j)}{e2\max}\right)^{\frac{1}{Gamma}}}$$

$Exb(i, j)$: setting value of gradation of blue subpixel $130sp$ included in pixel $130p$ positioned at $ith$ row and $jth$ column of liquid crystal panel 130

$Gb(i, j)$: blue gradation of pixel $IMp$ positioned at $ith$ row and $jth$ column of Input Image $IM$ $V(i, j)$: luminance of element $e2$ positioned at $ith$ row and $jth$ column of luminance estimation data D2

$e2$max: maximum luminance

Gamma: constant

The gradation setting data generator 153*d* uses an output value Exb(i, j) of the correction formula Ex generated by inputting the blue gradation Gb to the correction formula Ex as the setting value of the blue gradation of the pixel 130*p* as shown in FIG. 13.

The gradation setting data generator 153*d* performs similar processing by replacing the aforementioned blue gradation Gb(i, j) of the correction formula Ex with the green gradation Gg(i, j). An output value Exg(i, j) of the correction formula Ex obtained thereby is used as the setting value of the green gradation of the pixel 130*p*.

Also, the gradation setting data generator 153*d* performs similar processing by replacing the aforementioned blue gradation Gb(i, j) of the correction formula Ex with the red gradation Gr(i, j). An output value Exr(i, j) of the correction formula Ex obtained thereby is used as the setting value of the red gradation of the pixel 130*p*.

The gradation setting data generator 153*d* uses the output values Exb(i, j), Exg(i, j), and Exr(i, j) as the values of an element e3(*i, j*) at the ith row and the jth column of the gradation setting data D3.

The gradation setting data generator 153*d* performs these processing for all pixels 130*p* of the liquid crystal panel 130.

The gradation setting data D3 thus obtained is data of a matrix configuration that includes N2 rows and M2 columns. The value of the element e3(*i, j*) of the gradation setting data D3 at the ith row and the jth column is the setting value of the gradation of the pixel 130*p* positioned at the ith row and the jth column of the liquid crystal panel 130.

The gradation setting data generator 153*d* stores the gradation setting data D3 in the memory 152.

Although a specific example of the process of generating the gradation setting data D3 is described above, the process of generating the gradation setting data D3 is not limited to that described above. For example, the conversion formula that converts the luminance into the gradation may not be a conversion formula based on gamma correction.

The display process S6 of the image will now be described.

The control unit 153*e* displays the image on the liquid crystal panel 130 by controlling the backlight 110 based on the luminance setting data D1 and by controlling the liquid crystal panel 130 based on the gradation setting data D3.

Specifically, as shown in FIG. 5, the control unit 153*e* transmits the backlight control data SG1 generated based on the luminance setting data D1 to the driver 120 for the backlight via the output interface 154. The backlight control data SG1 is, for example, data of a PWM (Pulse Width Modulation) format, but is not particularly limited as long as the driver 120 for the backlight can operate based on the data. The driver 120 for the backlight controls the light emission of the light sources 114 based on the backlight control data SG1.

Also, the control unit 153*e* transmits the gradation setting data D3, which is the liquid crystal panel control data SG2, to the driver 140 for the liquid crystal panel via the output interface 154. Alternatively, the liquid crystal panel control data SG2 may be data converted from the gradation setting data D3 into a format that enables the driving of the driver 140 for the liquid crystal panel. The driver 140 for the liquid crystal panel controls the pixels 130*p*, and more specifically, light transmittances for the light of the subpixels 130*sp* based on the liquid crystal panel control data SG2.

The timing of converting the luminance setting data D1 into the backlight control data SG1 is not particularly limited as long as the timing is in or after the process S2. When converting the gradation setting data D3 into the liquid crystal panel control data SG2, the timing of the conversion is not particularly limited as long as the timing is in or after the process S5.

Effects of the first embodiment will now be described.

The image display method according to the first embodiment includes the process S2 of generating the luminance setting data D1, the process S3 of generating the luminance estimation data D2, the process S4 of calculating the maximum luminance e2max, the process S5 of generating the gradation setting data D3, and the process S6 of displaying the image.

In the process S2, the luminance setting data D1 including the setting values of the luminances of the light-emitting regions 110*s* of the backlight 110 is generated by using the input image IM input to the controller 150 of the image display device 100, which comprises the backlight 110 that includes the multiple light-emitting regions 110*s* in a matrix configuration and the liquid crystal panel 130 that includes the multiple pixels 130*p*.

In the process S3, the luminance estimation data D2 including the estimated luminances directly under the pixels 130*p* of the liquid crystal panel 130 is generated based on the luminance setting data D1 and the luminance profiles D4 of the light sources 114 located in the light-emitting regions 110*s* of the backlight 110.

In the process S4, the maximum luminance e2max of the luminance estimation data D2 is calculated.

In the process S5, the gradation setting data D3 including the setting values of the gradations of the pixels 130*p* of the liquid crystal panel 130 is generated by correcting the gradations of the pixels IMp of the input image IM based on the luminance estimation data D2 and the maximum luminance e2max.

In the process S6, the image is displayed on the liquid crystal panel 130 by controlling the backlight 110 by using the luminance setting data D1 and by controlling the liquid crystal panel 130 by using the gradation setting data D3.

Thus, according to the first embodiment, the setting values of the gradations of the pixels 130*p* of the liquid crystal panel 130 are determined by correcting the gradations of the pixels IMp of the input image IM based on the luminance estimation data D2 and the maximum luminance e2max. Therefore, the gradations of the pixels IMp of the input image IM can be corrected by including information of the maximum luminance e2max directly under the liquid crystal panel 130 corresponding to the input image IM. Thereby, contrast of the image displayed on the liquid crystal panel 130 can be improved.

In the process S5 of generating the gradation setting data D3, the gradations of the pixels IMp of the input image IM are corrected based on the estimated values of the luminances V(i, j) directly under the pixels 130*p* of the luminance estimation data D2 divided by the maximum luminance e2max. As a result, the contrast of the image displayed on the liquid crystal panel 130 can be improved.

The image display device 100 according to the first embodiment includes: the backlight 110 including the planar light source 111 that includes the multiple light-emitting regions 110*s* arranged in a matrix configuration and includes the light sources 114 located in the multiple light-emitting regions 110*s*; the liquid crystal panel 130 that is positioned on the backlight 110 and includes the multiple pixels 130*p*; and the controller 150 that controls the backlight 110 and the liquid crystal panel 130. The controller 150 includes the luminance setting data generator 153*a*, the luminance estimation data generator 153*b*, the maximum luminance calculator 153*c*, and the gradation setting data generator 153*d*.

The luminance setting data generator 153*a* uses the input image IM to generate the luminance setting data D1 including the setting values of the luminances of the light-emitting regions 110*s* of the backlight 110.

The luminance estimation data generator 153*b* generates the luminance estimation data D2 including the estimated luminances directly under the pixels 130*p* of the liquid crystal panel 130 that are estimated based on the luminance setting data D1 and the luminance profiles D4 of the light sources 114.

The maximum luminance calculator 153*c* calculates the maximum luminance e2max of the luminance estimation data D2.

The gradation setting data generator 153*d* generates the gradation setting data D3 including the setting values of the gradations of the pixels 130*p* of the liquid crystal panel 130 that are determined by correcting the gradations of the pixels IMp of the input image IM based on the luminance estimation data D2 and the maximum luminance e2max.

The control unit 153*e* displays the image on the liquid crystal panel 130 by controlling the backlight 110 based on the luminance setting data D1 and by controlling the liquid crystal panel 130 based on the gradation setting data D3.

According to the first embodiment, the setting values of the gradations of the pixels 130*p* of the liquid crystal panel 130 are determined by correcting the gradations of the pixels IMp of the input image IM based on the luminance estimation data D2 and the maximum luminance e2max. Therefore, the gradations of the pixels IMp of the input image IM can be corrected using the maximum luminance e2max corresponding to the input image IM. As a result, contrast of the image displayed on the liquid crystal panel 130 can be improved.

Second Embodiment

A second embodiment will now be described.

Figure 15:
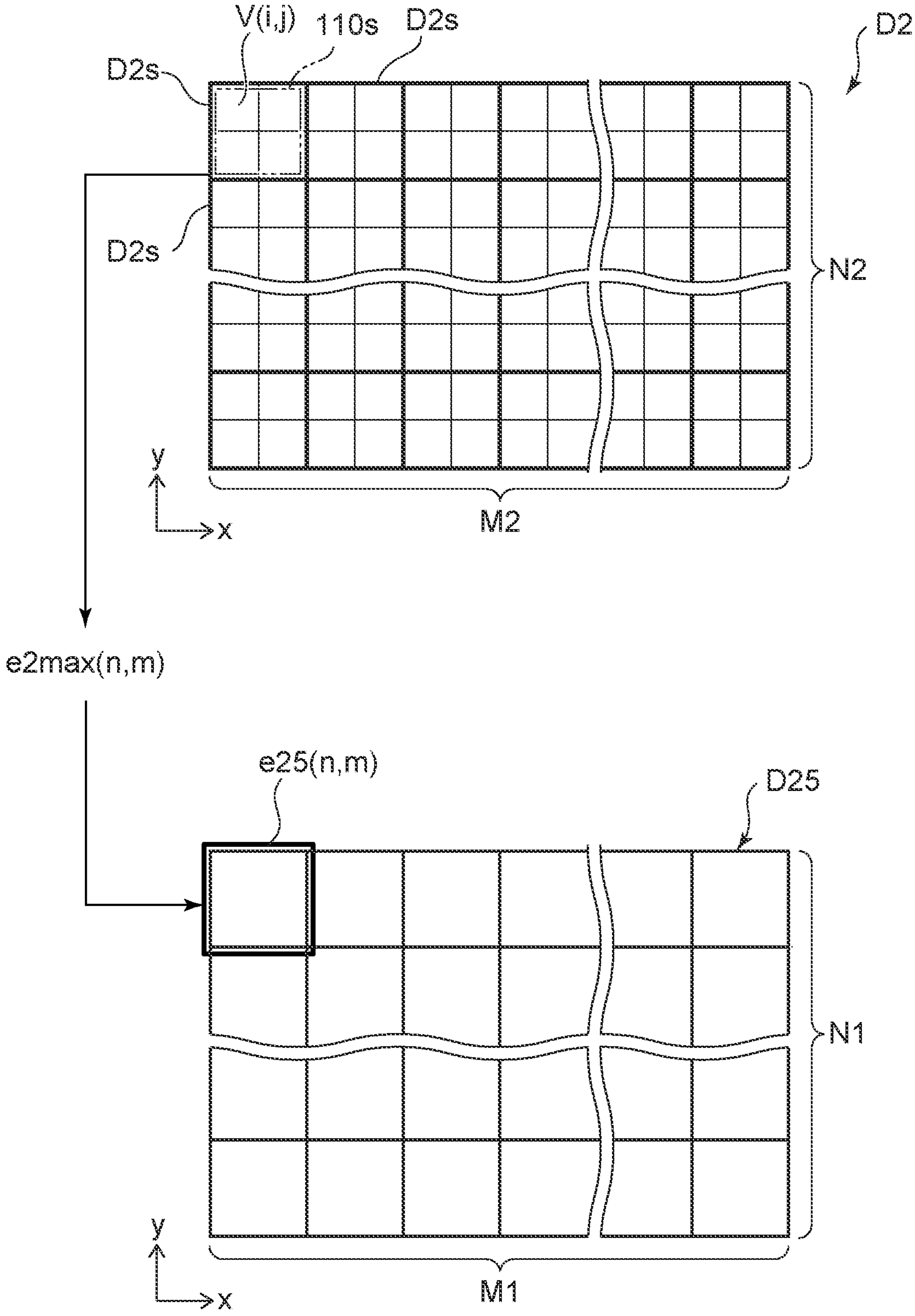
FIG. 15 is a schematic diagram showing a process of calculating maximum luminance in the image display method according to a second embodiment.

FIG. 15 is a schematic diagram showing a process of calculating maximum luminance in the image display method according to the second embodiment.

Figure 16:
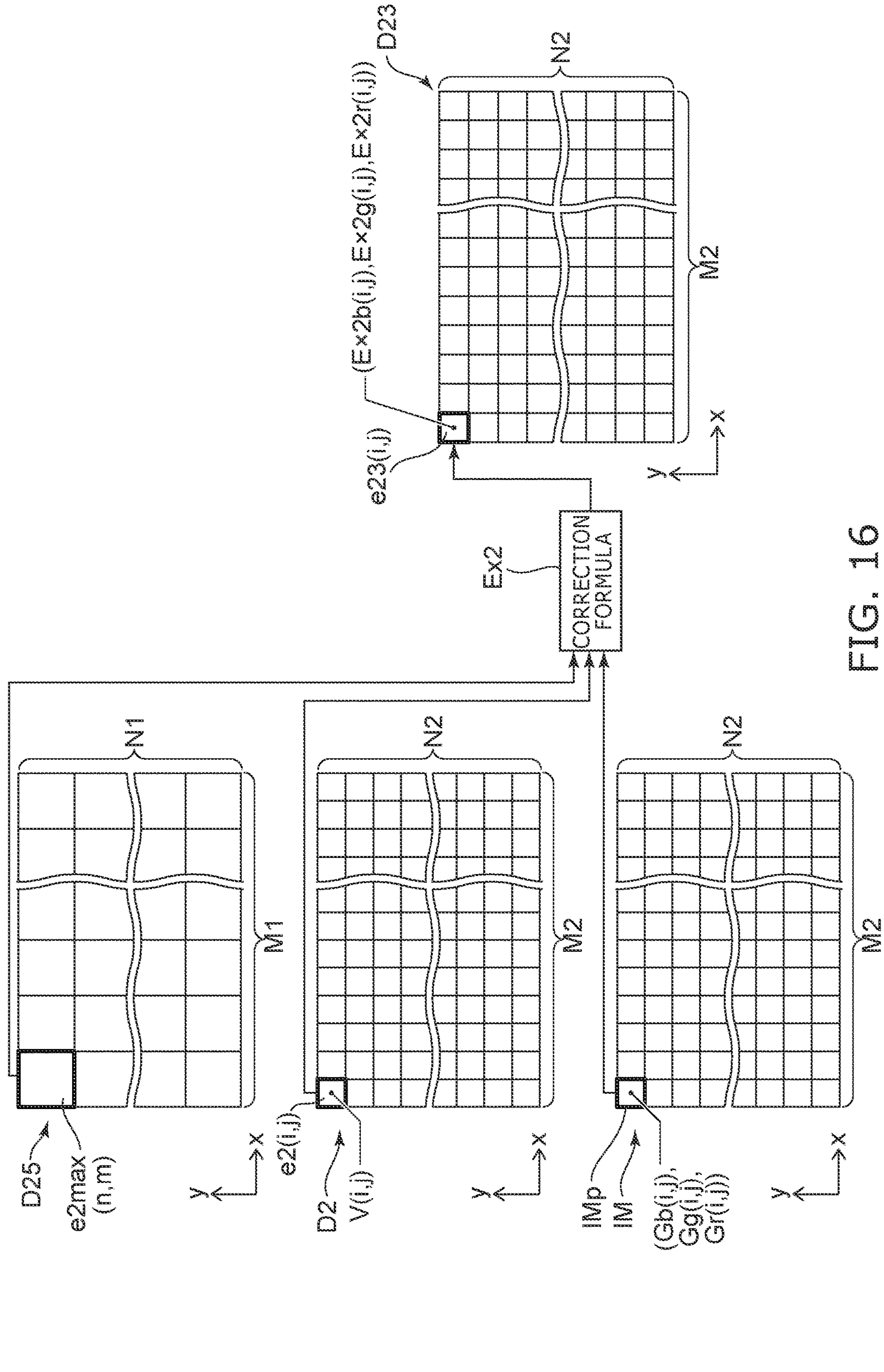
FIG. 16 is a schematic diagram showing a process of generating gradation setting data in the image display method according to the second embodiment.

FIG. 16 is a schematic diagram showing a process of generating gradation setting data in the image display method according to the second embodiment.

The process of calculating the maximum luminance e2max(n, m) and the process for generating the gradation setting data D23 in the image display method according to the second embodiment are different from those in the image display method according to the first embodiment.

As a general rule in the following description, only the differences with the first embodiment are described. Other than the aspects described below, the second embodiment is similar to the first embodiment.

First, the process of calculating the maximum luminance e2max(n, m) will be described.

According to the first embodiment, the maximum value of all of the luminances V(i, j) included in the luminance estimation data D2 is used as the maximum luminance e2max. In contrast, according to the second embodiment, as shown in FIG. 15, the maximum luminance e2max(n, m) is calculated for each area (may be referred to as "display area") D2*s* corresponding to one or more light-emitting regions 110*s* in the luminance estimation data D2.

According to the second embodiment, one area D2*s* in the luminance estimation data D2 corresponds to one light-emitting region 110*s*. Multiple luminances V(i, j) are included in each area D2*s*. However, in the luminance estimation data, one area may correspond to two or more of the light-emitting regions. Also, the number of corresponding light-emitting regions may not be the same for all areas.

Specifically, first, the maximum luminance calculator 153*c* determines the area D2*s* corresponding to the nth row and the mth column in the luminance estimation data D2.

Then, the maximum luminance calculator 153*c* uses the maximum value of all of the luminances V(i, j) included in the area D2*s* as the maximum luminance e2max(n, m).

Next, the maximum luminance calculator 153*c* uses the maximum luminance e2max(n, m) as the value of an element e25(*n, m*) at the nth row and the mth column of maximum luminance data D25 of a matrix configuration that includes N1 rows and M1 columns.

The maximum luminance calculator 153*c* performs similar processing for all of the areas D2*s*. The maximum luminance data D25 is generated thereby. The maximum luminance calculator 153*c* stores the maximum luminance data D25 in the memory 152.

The process of generating the gradation setting data D23 will now be described.

According to the first embodiment, a common maximum luminance e2max is used for all pixels 130*p* of the liquid crystal panel 130 when generating the gradation setting data D3 including the setting values of the gradations based on the correction formula Ex. In contrast, according to the second embodiment, the gradations of the pixels IMp of the input image IM are corrected based on the luminance estimation data D2 and the maximum luminance e2max(n, m) that is set for each of the areas D2*s* to which the pixels 130*p* correspond. The gradation setting data D23 including the setting values of the gradations of the pixels 130*p* of the liquid crystal panel 130 is generated thereby.

Specifically, first, the gradation setting data generator 153*d* inputs, into the following correction formula Ext, the luminance V(i, j) of the element e2(*i, j*) at the ith row and the jth column in the luminance estimation data D2, the blue gradation Gb(i, j) of the pixel IMp at the ith row and the jth column in the input image IM, and the maximum luminance e2max(n, m) of the area D2*s* to which the element e2(*i, j*) at the ith row and the jth column corresponds in the maximum luminance data D25.

[Formula 3]

$$\text{correction formula } Ex2\text{: } Ex2b(i, j) = Gb(i, j) \times \frac{1}{\left(\dfrac{V(i, j)}{e2\max(n, m)}\right)^{\frac{1}{Gamma}}}$$

$Ex2b(i, j)$: setting value of gradation of blue subpixel 130*sp* included in pixel 130*p* positioned at *ith* row and *jth* column of liquid crystal panel 130

$Gb(i, j)$: blue gradation of pixel *IMp* positioned at *ith* row and *jth* column of Input Image *IM*

$V(i, j)$: luminance of element *e*2 positioned at *ith* row and *jth* column of luminance estimation data D2

$e2\max(n,m)$: maximum luminance

Gamma: constant

The gradation setting data generator 153*d* uses an output value Ex2*b*(i, j) of the correction formula Ex2 generated by inputting the blue gradation Gb to the correction formula Ex2 as the setting value of the blue gradation of the pixel 130*p* positioned at the ith row and the jth column of the liquid crystal panel 130.

The gradation setting data generator 153*d* performs similar processing by replacing the aforementioned blue gradation Gb(i, j) of the correction formula Ex2 with the green gradation Gg(i, j). An output value Ex2*g*(i, j) of the correction formula Ex2 obtained thereby is used as the setting value of the green gradation of the pixel 130*p*.

Also, the gradation setting data generator 153*d* performs similar processing by replacing the aforementioned blue gradation Gb(i, j) of the correction formula Ex2 with the red gradation Gr(i, j). An output value Ex2*r*(i, j) of the correction formula Ex2 obtained thereby is used as the setting value of the red gradation of the pixel 130*p*.

The gradation setting data generator 153*d* uses the output values Ex2*b*(i, j), Ex2*g*(i, j), and Ex2*r*(i, j) as the values of an element e23(*i, j*) at the ith row and the jth column of the gradation setting data D23.

The gradation setting data generator 153*d* performs these processing for all pixels 130*p* of the liquid crystal panel 130.

The gradation setting data D23 thus obtained is data of a matrix configuration that includes N2 rows and M2 columns. The value of the element e23(*i, j*) of the gradation setting data D23 at the ith row and the jth column is the setting value of the gradation of the pixel 130*p* positioned at the ith row and the jth column of the liquid crystal panel 130.

The gradation setting data generator 153*d* stores the gradation setting data D23 in the memory 152.

As described above, in the process S3 of the image display method according to the second embodiment, the maximum luminance e2max(n, m) is calculated for each area D2*s*, which corresponding to one or more light-emitting regions 110*s* based on the luminance estimation data D2. In the process S4, the gradation setting data D23 including the setting values of the gradations of the pixels 130*p* of the liquid crystal panel 130 is generated by correcting the gradations of the pixels IMp of the input image IM based on the luminance estimation data D2 and the maximum luminance e2max(n, m) of each area D2*s*.

In such a manner, the maximum luminance e2max(n, m) is calculated for each area D2*s* corresponding to one or more light-emitting regions 110*s*, and the setting values of the gradations of the pixels 130*p* of the liquid crystal panel 130 are determined using the maximum luminance e2max(n, m) for each area D2*s*. Therefore, the gradations of the pixels 130*p* that are suited to the maximum luminance e2max(n, m) can be set for each area D2*s*. Accordingly, contrast of the image displayed on the liquid crystal panel 130 is improved.

According to the second embodiment, in the process S5 of generating the gradation setting data D23, the gradations of the pixels IMp of the input image IM are corrected based on the estimated values of the luminances V(i, j) directly under the pixels 130*p* of the luminance estimation data D2 divided by the maximum luminance e2max(n, m) for each area D2*s*. Accordingly, contrast of the image displayed on the liquid crystal panel 130 is improved.

Similarly, the maximum luminance calculator 153*c* of the image display device 100 according to the second embodiment calculates the maximum luminance e2max(n, m) for each area D2*s* corresponding to one or more light-emitting regions 110*s* based on the luminance estimation data D2. The gradation setting data generator 153*d* generates the gradation setting data D23 including the setting values of the gradations of the pixels 130*p* of the liquid crystal panel 130 by correcting the gradations of the pixels IMp of the input image IM based on the luminance estimation data D2 and the maximum luminance e2max(n, m) for each area D2*s*. Accordingly, contrast of the image displayed on the liquid crystal panel 130 is improved.

Figure 17A:
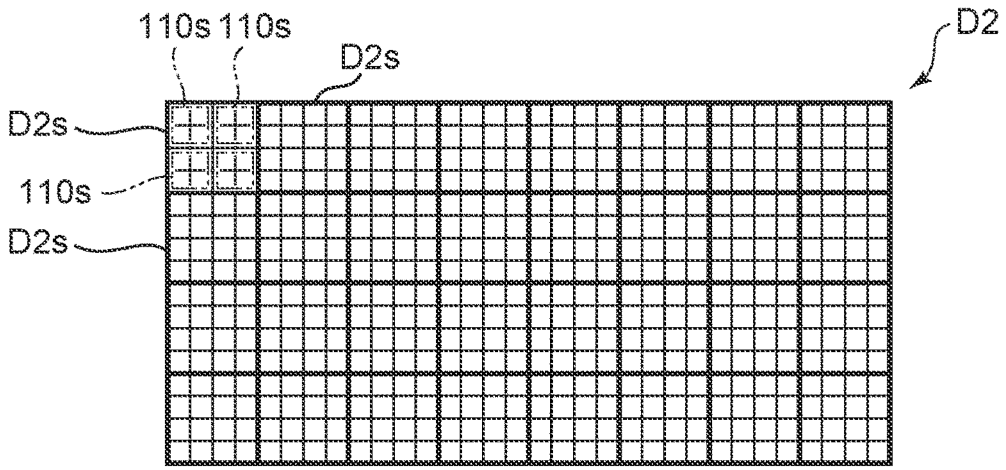
FIG. 17A is a schematic diagram showing another example of areas of the luminance estimation data.

FIG. 17A is a schematic diagram showing another example of areas of the luminance estimation data.

Figure 17B:
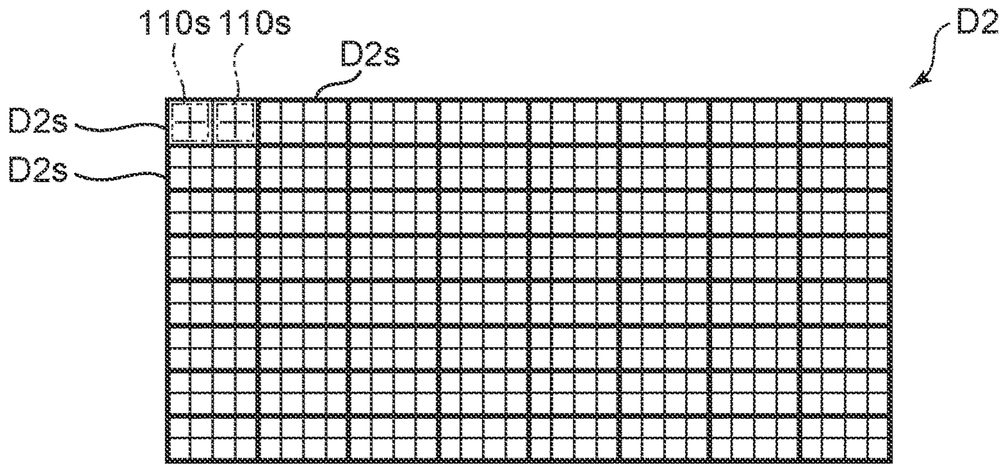
FIG. 17B is a schematic diagram showing another example of areas of the luminance estimation data.

FIG. 17B is a schematic diagram showing another example of areas of the luminance estimation data.

Figure 17C:
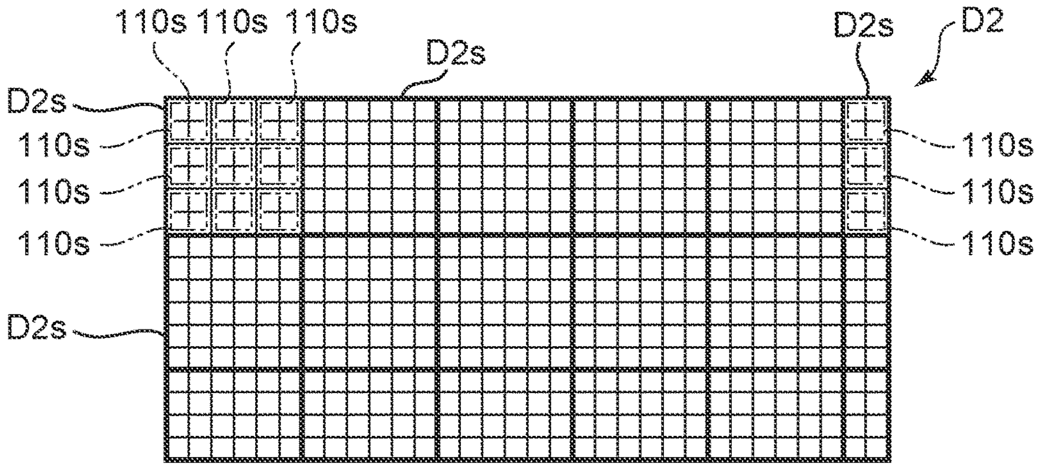
FIG. 17C is a schematic diagram showing another example of areas of the luminance estimation data.

FIG. 17C is a schematic diagram showing another example of areas of the luminance estimation data.

According to the second embodiment, one area D2*s* correspond to one light-emitting region 110*s*. However, in the luminance estimation data D2 as shown in FIGS. 17A to 17C, each area D2*s* may correspond to multiple light-emitting regions 110*s*.

In one area D2*s* as shown in FIG. 17A, the number of the corresponding light-emitting regions 110*s* in the x-direction and the number of the corresponding light-emitting regions 110*s* in the y-direction may be the same. In one area D2*s* as shown in FIG. 17B, the number of the corresponding light-emitting regions 110*s* in the x-direction and the number of the corresponding light-emitting regions 110*s* in the y-direction may be different.

As shown in FIG. 17C, the number of the corresponding light-emitting regions 110*s* may not be the same in all of the areas D2*s*.

For example, the invention can be utilized in the display of a device such as a television, a personal computer, a game machine, etc.

What is claimed is:

1. An image display method comprising:

generating luminance setting data that sets a luminance value for each of a plurality of light-emitting regions of a backlight panel configured in a matrix form based on an input image;

generating luminance estimation data that indicates an estimated luminance value of backlight for the input image with respect to each of a plurality of pixels of a liquid crystal panel, the liquid crystal panel being coupled to the backlight panel, the luminance estimation data being generated based on i) the luminance setting data and ii) luminance profile data indicating a luminance distribution in each of the light-emitting regions of the backlight panel;

determining a maximum luminance value among the estimated luminance values of the pixels in the luminance estimation data;

generating gradation setting data that sets a gradation value of each of the pixels of the liquid crystal panel for the input image, based on the input image, the luminance estimation data, and the maximum luminance value; and controlling the backlight panel to operate based on the luminance setting data and the liquid crystal panel to operate based on the gradation setting data to display an image corresponding to the input image, wherein said generating gradation setting data comprises:

dividing each of the estimated luminance values of the pixels in the luminance estimation data by the maximum luminance value to generate normalized luminance estimation data; and performing correction of gradation values of image pixels indicated by the input image using the normalized luminance estimation data to generate the gradation setting data, wherein through the correction of the gradation values of the image pixel indicated by the input image, a first corrected gradation value of each pixel of the liquid crystal panel corresponding to a normalized luminance value of one is set to be a maximum gradation value that can be set by the liquid crystal panel, a second corrected gradation value of each pixel of the liquid crystal panel corresponding to a normalized luminance value of zero is set to be a minimum gradation value that can be set by the liquid crystal panel, and a third corrected gradation value of each pixel of the liquid crystal panel corresponding to a normalized luminance value greater than zero and less than one is set to be a gradation value greater than the minimum gradation value and less than the maximum gradation value, and wherein the first, second, third corrected gradation values are expressed by a formula:

$$Ex(i, j) = G(i, j) \times \frac{1}{\left(\frac{V(i, j)}{e2\max}\right)^{\frac{1}{Gamma}}},$$

wherein Ex(i,j) is a corrected gradation value at a pixel of row i and column j of the liquid crystal panel, G(i,j) is a gradation value of an image pixel of row i and column j of the input image, V(i,j) is an estimated luminance value of the backlight at the pixel, e2max is the maximum luminance value, and Gamma is a gamma value.

2. The image display method according to claim 1, wherein said generating luminance setting data comprises:

with respect to each of the light-emitting regions of the backlight panel, determining the luminance value based on a maximum gradation value among gradation values of image pixels of the input image that correspond to the light-emitting region.

3. The image display method according to claim 1, wherein the maximum luminance value is a scalar value.

4. The image display method according to claim 1, wherein each of the light-emitting regions of the backlight panel corresponds to a plurality of pixels of the liquid crystal panel.

5. The image display method according to claim 1, wherein each of the light-emitting regions of the backlight panel corresponds to a single light-emitting element.

6. An image display method comprising:

generating luminance setting data that sets a luminance value for each of a plurality of light-emitting regions of a backlight panel configured in a matrix form based on an input image;

generating luminance estimation data that indicates an estimated luminance value of backlight for the input image with respect to each of a plurality of pixels of a liquid crystal panel, the liquid crystal panel being coupled to the backlight panel, the luminance estimation data being generated based on i) the luminance setting data and ii) luminance profile data indicating a luminance distribution in each of the light-emitting regions of the backlight panel;

generating maximum luminance data that indicates a maximum luminance value for each of a plurality of display areas, based on a maximum value among the estimated luminance values of pixels corresponding to the display area;

generating gradation setting data that sets a gradation value of each of the pixels of the liquid crystal panel for the input image, based on the input image, the luminance estimation data, and the maximum luminance data; and controlling the backlight panel to operate based on the luminance setting data and the liquid crystal panel to operate based on the gradation setting data to display an image corresponding to the input image, wherein said generating gradation setting data comprises:

dividing each of the estimated luminance values of the pixels in the luminance estimation data by a maximum luminance value of a corresponding display area indicated by the maximum luminance data, to generate normalized luminance estimation data; and performing correction of gradation values of image pixels indicated by the input image using the normalized luminance estimation data to generate the gradation setting data, wherein through the correction of the gradation values of the image pixel indicated by the input image, a first corrected gradation value of each pixel of the liquid crystal panel corresponding to a normalized luminance value of one is set to be a maximum gradation value that can be set by the liquid crystal panel, a second corrected gradation value of each pixel of the liquid crystal panel corresponding to a normalized luminance value of zero is set to be a minimum gradation value that can be set by the liquid crystal panel, and a third corrected gradation value of each pixel of the liquid crystal panel corresponding to a normalized luminance value greater than zero and less than one is set to be a gradation value greater than the minimum gradation value and less than the maximum gradation value, and wherein the first, second, and third gradation values are expressed by a formula:

$$Ex(i, j) = G(i, j) \times \frac{1}{\left(\frac{V(i, j)}{e2\max(n, m)}\right)^{\frac{1}{Gamma}}},$$

wherein Ex(i,j) is a corrected gradation value at a pixel of row i and column i of the liquid crystal panel, G(i,j) is a gradation value of an image pixel of row i and column i of the input image, V(i,j) is an estimated luminance value of the backlight at the pixel, e2max(n,m) is the maximum luminance value of a corresponding display area at row n and column m, and Gamma is a gamma value.

7. The image display method according to claim 6, wherein said generating luminance setting data comprises:

with respect to each of the light-emitting regions of the backlight panel, determining the luminance value based on a maximum gradation value among gradation values of image pixels of the input image that correspond to the light-emitting region.

8. The image display method according to claim 6, wherein the maximum luminance data comprises a matrix.

9. The image display method according to claim 6, wherein each of the light-emitting regions of the backlight panel corresponds to a plurality of pixels of the liquid crystal panel.

10. The image display method according to claim 6, wherein each of the display areas corresponds to one of the light-emitting regions of the backlight panel, and each of the light-emitting regions of the backlight panel corresponds to a single light-emitting element.

11. The image display method according to claim 6, wherein each of the display areas corresponds to a plurality of the light-emitting regions of the backlight panel, and each of the light-emitting regions of the backlight panel corresponds to a single light-emitting element.

12. A display comprising:

a backlight panel including a plurality of light-emitting regions that are configured in a matrix form and independently operable;

a liquid crystal panel coupled to the backlight panel and including a plurality of pixels; and a controller configured to:

generate luminance setting data that sets a luminance value for each of the light-emitting regions of the backlight panel based on an input image;

generating luminance estimation data that indicates an estimated luminance value of backlight for the input image with respect to each of the pixels of the liquid crystal panel, the luminance estimation data being generated based on i) the luminance setting data and ii) luminance profile data indicating a luminance distribution in each of the light-emitting regions of the backlight panel;

generate maximum luminance data that indicates a maximum luminance value for each of a plurality of display areas, based on the estimated luminance values of the pixels in the luminance estimation data;

generate gradation setting data that sets a gradation value for each of the pixels of the liquid crystal panel for the input image based on the input image, the luminance estimation data, and the maximum luminance data; and control the backlight panel to operate based on the luminance setting data and the liquid crystal panel to operate based on the gradation setting data to display an image corresponding to the input image, wherein the controller is configured to, during generation of the gradation setting data, divide each of the estimated luminance values of the pixels in the luminance estimation data by a maximum luminance value of a corresponding display area indicated by the maximum luminance data, to generate normalized luminance estimation data; and perform correction of gradation values of image pixels indicated by the input image using the normalized luminance estimation data to generate the gradation setting data, wherein through the correction of the gradation values of the image pixel indicated by the input image, a first corrected gradation value of each pixel of the liquid crystal panel corresponding to a normalized luminance value of one is set to be a maximum gradation value that can be set by the liquid crystal panel, a second corrected gradation value of each pixel of the liquid crystal panel corresponding to a normalized luminance value of zero is set to be a minimum gradation value that can be set by the liquid crystal panel, and a third corrected gradation value of each pixel of the liquid crystal panel corresponding to a normalized luminance value greater than zero and less than one is set to be a gradation value greater than the minimum gradation value and less than the maximum gradation value, and wherein the first, second, and third gradation values are expressed by a formula:

$$Ex(i, j) = G(i, j) \times \frac{1}{\left(\frac{V(i, j)}{e2\max(n, m)}\right)^{\frac{1}{Gamma}}},$$

wherein Ex(i,j) is a corrected gradation value at a pixel of row i and column i of the liquid crystal panel, G(i,j) is a gradation value of an image pixel of row i and column i of the input image, V(i,j) is an estimated luminance value of the backlight at the pixel, e2max(n,m) is the maximum luminance value of a corresponding display area at row n and column m, and Gamma is a gamma value.

13. The display according to claim 12, wherein each of the display areas corresponds to one of the light-emitting regions of the backlight panel, and each of the light-emitting regions of the backlight panel corresponds to a single light-emitting element.

14. The display according to claim 12, wherein each of the display areas corresponds to a plurality of the light-emitting regions of the backlight panel, and each of the light-emitting regions of the backlight panel corresponds to a single light-emitting element.

* * * * *